(12) United States Patent
Ohta

(10) Patent No.: US 7,969,619 B2
(45) Date of Patent: Jun. 28, 2011

(54) INFORMATION TRACKING METHOD, IMAGE FORMING APPARATUS, INFORMATION PROCESSING APPARATUS, AND INFORMATION TRACKING PROGRAM

(75) Inventor: Yusuke Ohta, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 1004 days.

(21) Appl. No.: 11/878,854

(22) Filed: Jul. 27, 2007

(65) Prior Publication Data
US 2008/0037071 A1 Feb. 14, 2008

(30) Foreign Application Priority Data

Aug. 8, 2006 (JP) ................................ 2006-216127

(51) Int. Cl.
*H04N 1/04* (2006.01)
(52) U.S. Cl. ......... 358/403; 358/474; 358/450; 358/496
(58) Field of Classification Search .................. 358/403, 358/474, 450, 496, 497
See application file for complete search history.

(56) References Cited

U.S. PATENT DOCUMENTS

| 5,933,829 | A | * | 8/1999 | Durst et al. ........................... 1/1 |
| 2004/0119605 | A1 | | 6/2004 | Schaper |
| 2004/0193641 | A1 | | 9/2004 | Lin |

FOREIGN PATENT DOCUMENTS

| JP | 3265621 | 1/2002 |
| JP | 2004-102562 | 4/2004 |
| JP | 3598331 | 9/2004 |
| JP | 2005-038372 | 2/2005 |

OTHER PUBLICATIONS

Stanford, V., "Pervasive Computing Goes the Last Hundred Feet with RFID Systems", IEEE Pervasive Computing, IEEE Service Center, Los Alamitos, CA, US, vol. 2, No. 2, Apr. 2003, pp. 9-14.
'Fingerprinting' documents and packaging, Nature, vol. 436, pp. 475, Jul. 28, 2005.

* cited by examiner

*Primary Examiner* — Houshang Safaipour
(74) *Attorney, Agent, or Firm* — Dickstein Shapiro LLP

(57) ABSTRACT

A computer-executable information tracking method, an image forming apparatus, an information processing apparatus, and a program to adequately track the information flow of a paper document are disclosed. The method includes a first detecting step of, whenever an input or output of information is performed using a paper as a medium, detecting paper identification information that uniquely identifies the paper from other paper; a storing step of associating and storing the paper identification information with information regarding the input or output of information in a recording device; a second detecting step of detecting the paper identification information of a designated paper; an information searching step of searching for the information regarding the input or output of information on the designated paper by comparing the paper identification information of the designated paper with the paper identification information stored in the recording device.

15 Claims, 16 Drawing Sheets

```
TIME            : 10:10
USER            : A
MICRO-PATTERN   : [γ]
OPERATION TYPE  : Scan(copy)
IMAGE ID        : 002
```

```
TIME            : 10:10
USER            : A
MICRO-PATTERN   : [ε]
OPERATION TYPE  : Print(copy)
IMAGE ID        : 002
```

INFORMATION TRACKING METHOD, IMAGE FORMING APPARATUS, INFORMATION PROCESSING APPARATUS, AND INFORMATION TRACKING PROGRAM

BACKGROUND OF THE INVENTION

1. Field of the Invention

The present invention generally relates to an information tracking method, an image forming apparatus, an information processing apparatus, and an information tracking program.

2. Description of the Related Art

Recently, with the development of IT systems, important documents have been widely leaked and the leakage (unauthorized disclosure) of information has become a serious problem. Various measures to prevent the leakage of electronic documents have been taken based on security technologies such as user identification and access control. However it is conceived that measures to prevent the leakage by delivering a paper document are being left behind. As a conventional example to prevent the leakage by delivering a paper document, there is a method of stamping a secret mark on the document. However it has nothing more than a psychological deterrent effect. There is another method of adding information of time and who printed or copied the output document. See, for example, Patent Document 1: Japanese Patent No. 3265621.

However, when information is leaked by delivering a paper document, conventional techniques do not provide sufficient measures to accurately determine who leaked the document and who received the document. Without being able to identify who leaked the information, even when the leakage is acknowledged, the leakage of the information may continue. Without being able to identify who receives the leaked information, there remains a problem that further leakage cannot be prevented.

SUMMARY OF THE INVENTION

The present invention is made in light of the above problems, and the present invention may provide an information tracking method enabling getting an accurate information flow of a paper document, an image forming apparatus of the same, an information processing apparatus of the same, and an information tracking program of the same.

To solve the problems, according to one embodiment of the present invention, there is provided a computer-executable information tracking method, the method including a first detecting step of, whenever an input or output of information is performed using a paper as a medium, detecting paper identification information that uniquely identifies the paper; a storing step of associating the paper identification information with information regarding the input or output of information and storing the paper identification information and the information regarding the input or output of information in a recording device; a second detecting step of detecting the paper identification information of a designated paper; and an information searching step of searching for the information regarding the input or output of information on the designated paper by comparing the paper identification information of the designated paper with the paper identification information stored in the recording device.

To solve the problems, according to another embodiment of the present invention, there is provided a computer-executable information tracking method, the method including a first detecting step of, whenever an input of information is performed using a paper as a medium, detecting paper identification information that is synthesized with the information and that uniquely identifies the paper; an output step of, whenever an output of information is performed, synthesizing the paper identification of a paper of output destination with the information and outputting the paper identification of the paper of output destination and the information; a storing step of associating the paper identification information with information regarding the input or output of information and storing the paper identification information and the information regarding the input or output of information in a recording device; a second detecting step of detecting the paper identification information of a designated paper; and an information searching step of searching for the information regarding the input or output of information on the designated paper by comparing the paper identification information of the designated paper with the paper identification information stored in the recording device.

By the above information tracking methods, it is possible to get an accurate information flow of a paper document.

According to embodiments of the present invention, there are provided an information tracking method enabling getting an accurate information flow of a paper document, an image forming apparatus of the same, an information processing apparatus of the same, and an information tracking program of the same.

BRIEF DESCRIPTION OF THE DRAWINGS

FIG. 5 is a drawing showing an example of a tracking log generated in a scanning process;

FIG. 6 is a drawing showing an example of a tracking log generated in a printing process;

DETAILED DESCRIPTION OF THE PREFERRED EMBODIMENTS

Figure 1:
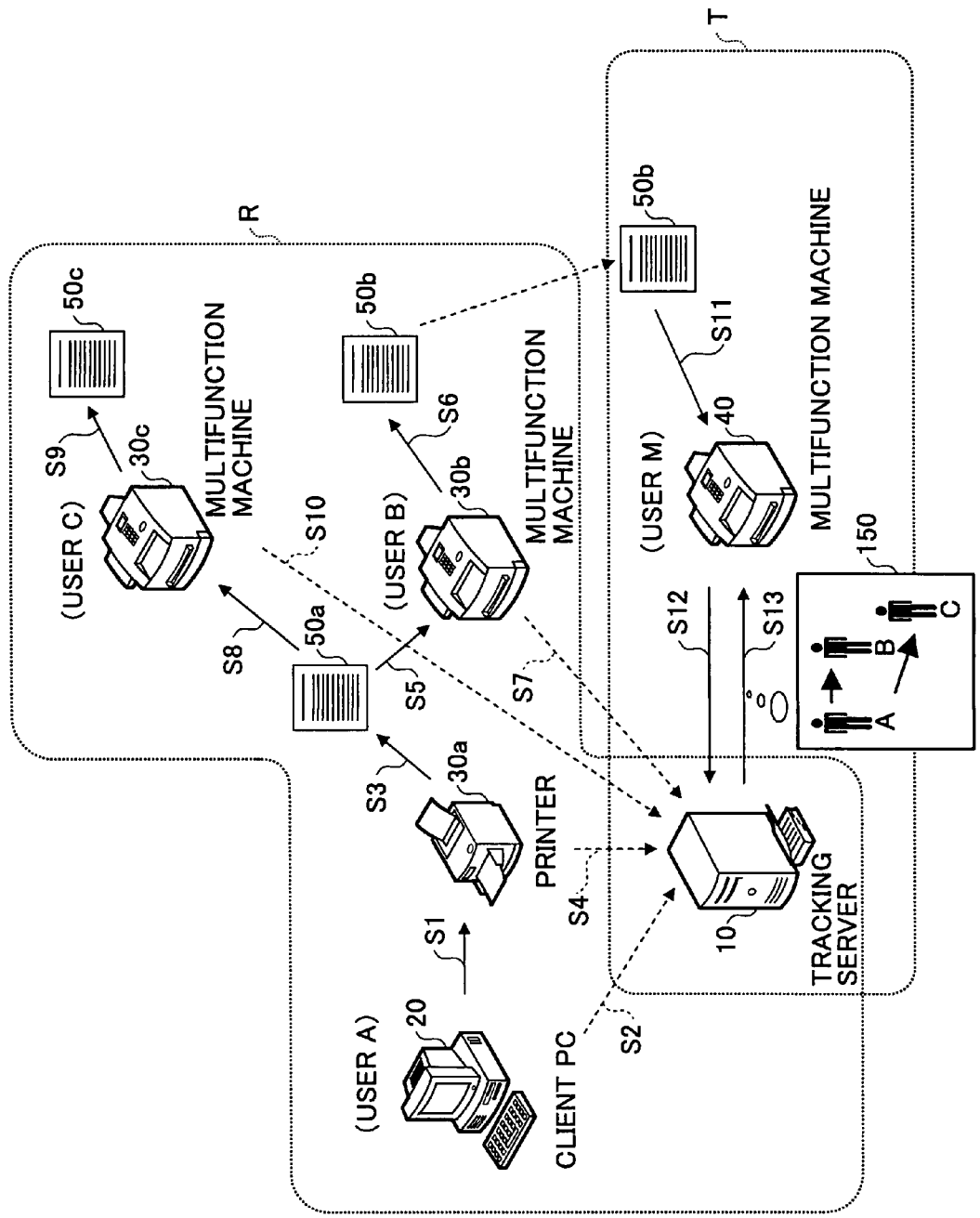
FIG. 1 is a drawing showing the outline of an embodiment of the present invention.

Embodiments of the present invention are explained below with reference to the accompanying drawings. FIG. 1 illustrates the outline of the embodiments of the present invention. Each method of the embodiments generally includes "a recording step" and "a tracking step". In the figure, the operations in the region surrounded by dotted lines R and T refer to the recording step and the tracking step, respectively.

In the recording step, an image forming apparatus handling an image of a paper, such as a printer, a copy machine, a scanner, and a multifunction machine, associates an identifier that uniquely identifies a paper used as a medium of information when printed, copied, and scanned with the operating information or the like of the paper, and stores the associated data as its tracking log. The operating information includes the date and time information when the operation (such as printing, copying, and scanning) is performed, the identification information of a user (such as a user ID), and the identification information of an apparatus where the operation is performed (such as an apparatus ID), which will be necessary in the tracking step. Further, it is necessary for the identifier of a paper to be detected from the paper. In the embodiments, terms "paper document" and "paper" are used in a different meaning. The former refers to transmitting or distributing information (such as a character, a drawing, and picture (an image)) using a paper as a medium. The latter refers to a paper itself as a medium of information. Therefore, the identifier of a paper refers to the information that uniquely identifies the paper, and even when there are plural paper documents having the same information, one identifier of a paper of the paper documents is different from any other identifier of the other papers.

In the recording step R shown in FIG. 1, first, a user A performs operations so that an electronic document stored in a client PC 20 is printed out on a paper document 50a by a printer 30a (S1,S3). Next, a user B performs operations so that the paper document 50a is copied on a paper document 50b by a multifunction machine 30b (S5,S6). Then, a user C performs operations so that the paper document 50a is copied on a paper document 50c by a multifunction machine 30c (S8,S9).

In this case, whenever information is input or output using a paper as a medium of the information by an apparatus involved in the recording step R, the apparatus accordingly transmits the identifier of the paper used as the medium and the operating information of the paper to a tracking server 10. Namely, the client PC 20 transmits the operating information of the instruction to print an electronic file and the identification information (such as a file name) of the electronic document to the tracking server 10 (S2). The identification information of the electronic document is transmitted along with the instruction of printing the electronic document to the printer 30a. The printer 30a transmits the identification information of the electronic documents, the identification of a paper of the paper documents 50a, and the operating information of the printing operation to the tracking server 10 (S4). Since the identification information of the electronic documents of the copy source and the identifier of a paper of the document paper 50a are transmitted by the multifunction machine 30b, the electronic document can be associated with the paper. The multifunction machine 30b transmits the identifier of a paper of the paper document 50a of the copy source, the identifier of a paper of the paper document 50b of the copy destination, and the operating information of the copy operations to the tracking server 10 (S7). The multifunction machine 30c transmits the identifier of a paper of the paper document 50a of the copy source, the identifier of a paper of the paper document 50c of the copy destination, and the operating information of the copy operations to the tracking server 10 (S10). The tracking server 10 stores the information transmitted from each apparatus as a tracking log.

On the other hand, in the tracking step T, as a distribution of the paper document, at least the source (from which the paper document is distributed) or destination (to which the paper document is distributed) of a paper document is analyzed by searching for a tracking log stored in the recording step based on the identifier that is detected by a detector capable of detecting an identifier from a paper document.

The tracking step T in FIG. 1 shows where a user M, a document administrator, tries to analyze the distribution route of the paper document 50b. In this case, the user M gives an instruction to a multifunction machine 40 having a function to detect the identifier of a paper to analyze the distribution route of the paper document 50b (S11). The multifunction machine 40 responds to the instruction from the user M to detect the identifier of the paper of the paper document 50b and transmits the identifier to the tracking sever 10 (S12). According to the received identifier, the tracking server 10 analyzes the distribution route of the paper (paper document 50b) having the identifier by searching for the stored tracking logs, and returns an analyzed result 150 to the multifunction machine 40 (S13). The multifunction machine 40, for example, displays the analyzed result on its operations display. By the displayed information, the user M can check the distribution route of the paper document 50b.

Figure 2:
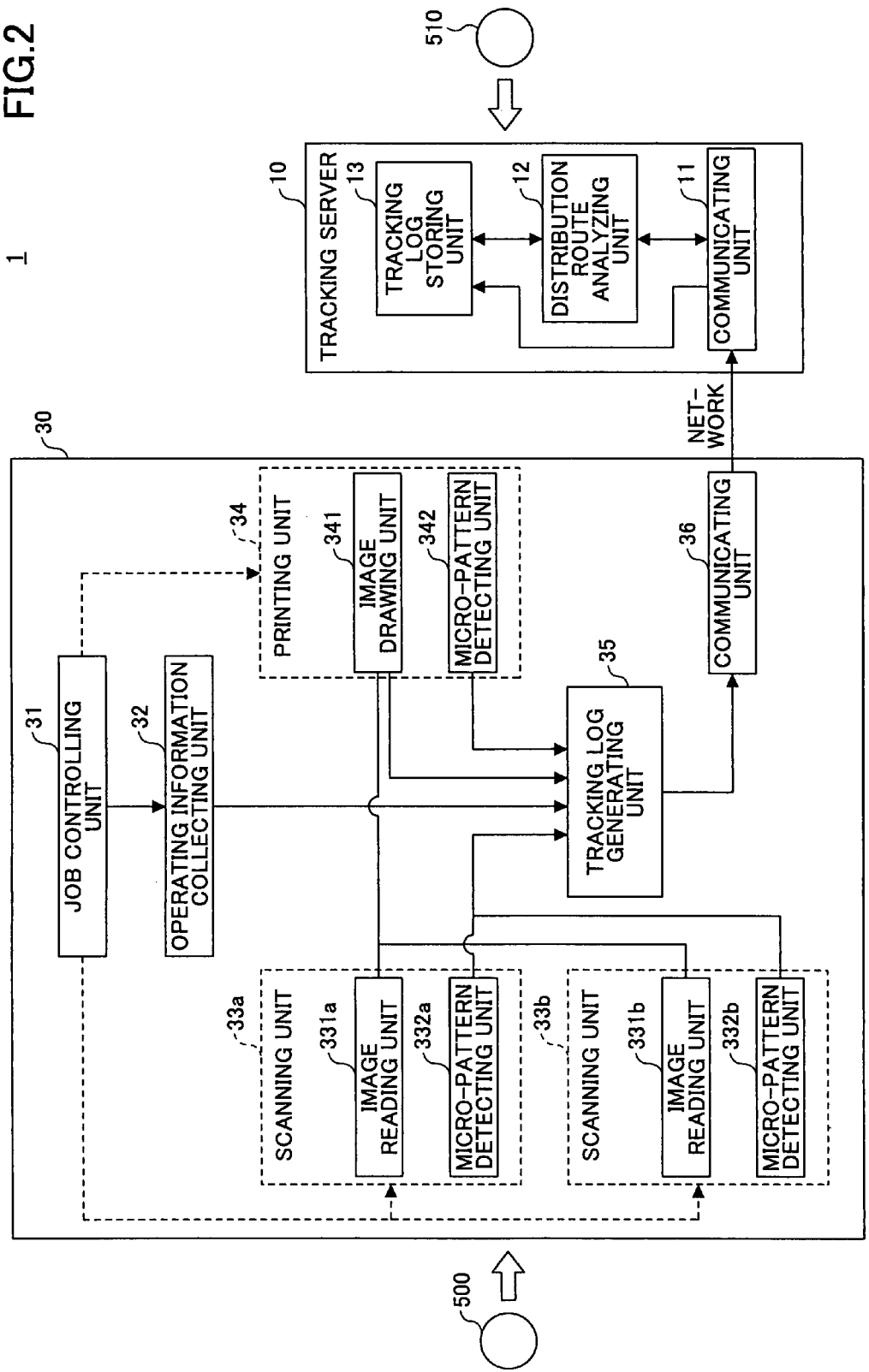
FIG. 2 is a drawing showing a sample configuration of a tracking log recording system that performs a recording step according to a first embodiment of the present invention.

In the following, a more detailed explanation is provided. FIG. 2 shows a configuration sample of a tracking log recording system that realizes the recording step of a first embodiment of the present invention.

In FIG. 2, a tracking log recording system 1 includes one or more multifunction machines 30 and a tracking server 10, mutually connected to each other through a (wired or wireless) network such as the Internet and a Local Area Network (LAN).

The multifunction machine 30 in FIG. 1 is one example of an apparatus such as the printer 30a, the multifunction machine 30b, and the multifunction machine 30c. Namely, a multifunction machine is not always necessary as an element of the tracking log recording system 1, and thus a printer, a copy machine, a scanner, a facsimile or the like may be substituted for the multifunction machine. In FIG. 2, the multifunction machine includes a job controlling unit 31, a operating information collecting unit 32, scanning units 33a and 33b (when named generically, "scanning unit 33"), a printing unit 34, a tracking log generating unit 35, and a communicating unit 36. Each of the units can be operated when a program installed in the multifunction machine 30 is executed by the CPU of the multifunction machine 30. The program may be downloaded through a network or may be installed using a recording medium 500 such as a CD-ROM and a SD memory card.

The job controlling unit 31 controls the overall processing of jobs (including copy, print, and scan) according to an instruction from a user.

The operating information collecting unit 32 collects the operating information regarding inputting information from a paper document or outputting information to a paper document. For example, date and time information when an operation (such as printing, copying, and scanning) is performed, a user ID of a user who gives the instruction for the operation, and a device ID of the multifunction machine 30 are collected.

The scanning unit 33a includes an image reading unit 331a and a micro-pattern detecting unit 332a. The scanning unit 33b includes an image reading unit 331a and a micro-pattern detecting unit 332b. Since the image reading unit 331a and the image reading unit 331b have similar functions, when named generically, they are referred to as "an image reading unit 331". Similarly, since the micro-pattern detecting unit 332a and the micro-pattern detecting unit 332b have similar functions, when named generically, they are referred to as "a micro-pattern detecting unit 332".

The image reading unit 331 inputs (or optically reads) the information (image) of a paper document by controlling a scanner of a multifunction machine 30. The micro-pattern detecting unit 332 controls a micro-pattern detector that is included in the multifunction machine 30 and that detects concavities and convexities of the random patterns (in the embodiments, the pattern is referred to as "micro-pattern") of plant fiber on a surface of a paper so that the detector detects the "micro-pattern" of the paper of the paper document when the paper document is read by the scanner. The micro-pattern detector irradiates a laser onto a part of the paper surface and detects the strength of the reflected light. The information that is detected above corresponds to the micro-pattern. In the embodiments of the present invention, the micro-pattern is used as the identifier to uniquely identify the paper of a paper document. Like a human fingerprint, the micro-pattern is formed so as to be unique to each paper, and is thus well-suited to be used as the identifier to uniquely identify a paper. From the point of view that the micro-pattern is not one that is to be added to the paper by, for example, an additional process, but is a lasting identifier that each paper originally has, it is preferable to adopt the micro-pattern as the identifier in the embodiments of the present invention. A detailed description of the micro-pattern is provided in "Nature Vol. 436 28 Jul. 2005 p 475 (hereinafter "Reference Document 1").

The reason why two scanning units 33 are included is that a general-purpose multifunction machine has two scanners to read an image at both its contact glass and its Auto Document Feeder (ADF). Therefore, the number of the scanning units 33 is not always two but may be one or three or more, which does not affect the basic structure.

The printing unit 34 includes an image drawing unit 341 and a micro-pattern detecting unit 342. The image drawing unit 341 controls a printer engine of the multifunction machine 30 to output the information (image) to a paper. The micro-pattern detecting unit 342 causes the micro-pattern detector of the multifunction machine 30 to detect the micro-pattern on the paper where the image is to be printed. It should be noted that the micro-pattern detecting unit 332 of the scanning unit 33 and the micro-pattern detecting unit 342 of the printing unit 34 should be disposed so that they can detect a micro-pattern always from the same part of a paper to distinguish the difference of the papers in the tracking step. For example, in an ADF and a printer, the micro-pattern detector may be displaced on the way of a feeding path of the paper so as to detect at the same timing when the paper is passed through the detector.

The tracking log generating unit 35 generates a tracking log in a prescribed format based on the operating information collected by the operating information collecting unit 32 and any one of the micro-pattern of the scanned paper detected by the micro-pattern detecting unit 332 in the scanning unit 33 and the micro-pattern of the copied paper detected by the micro-pattern detecting unit 342 in the printing unit 34 or both.

The communicating unit 36 transmits the tracking log to the tracking server 10 through a network.

On the other hand, the tracking server 10 includes a communicating unit 11, a distribution route analyzing unit 12, and a tracking log storing unit 13. The communicating unit 11 receives a tracking log from each apparatus connected through a network. The tracking log storing unit 13 records the received tracking log onto, for example, a recording medium in the tracking server 10 in a prescribed format and stores the tracking log. The distribution route analyzing unit 12 analyzes the distribution route of the paper document based on the tracking logs stored in the tracking log storing unit 13. Each of the units can be operated when a program installed in the tracking server 10 is executed by the CPU of the tracking server 10. The program may be downloaded through a network or may be installed using a recording medium 510 such as a CD-ROM and a SD memory card.

Figure 3:
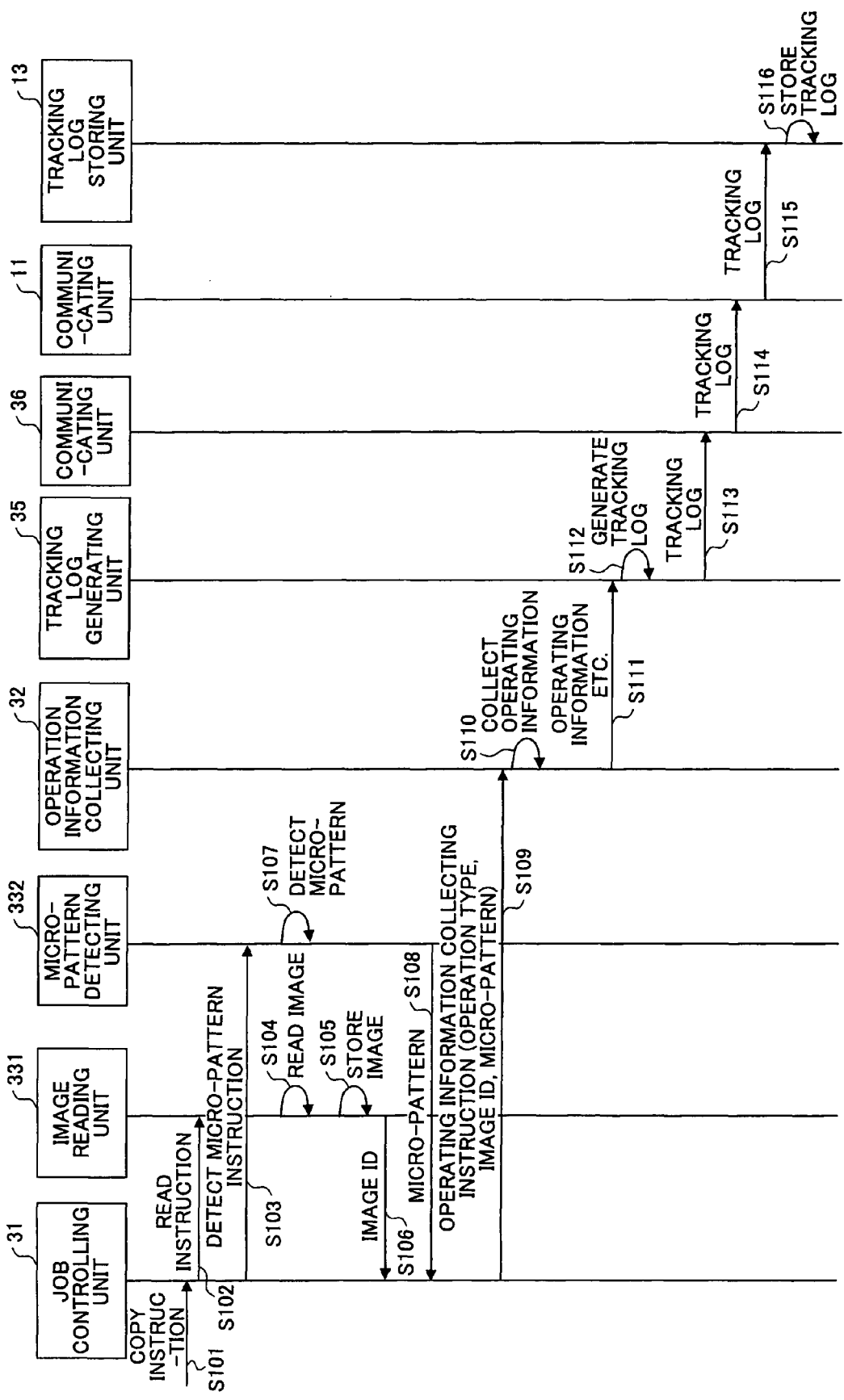
FIG. 3 is a sequence diagram showing a tracking log recording process performed by the tracking log recording system according to the first embodiment of the present invention.
Figure 4:
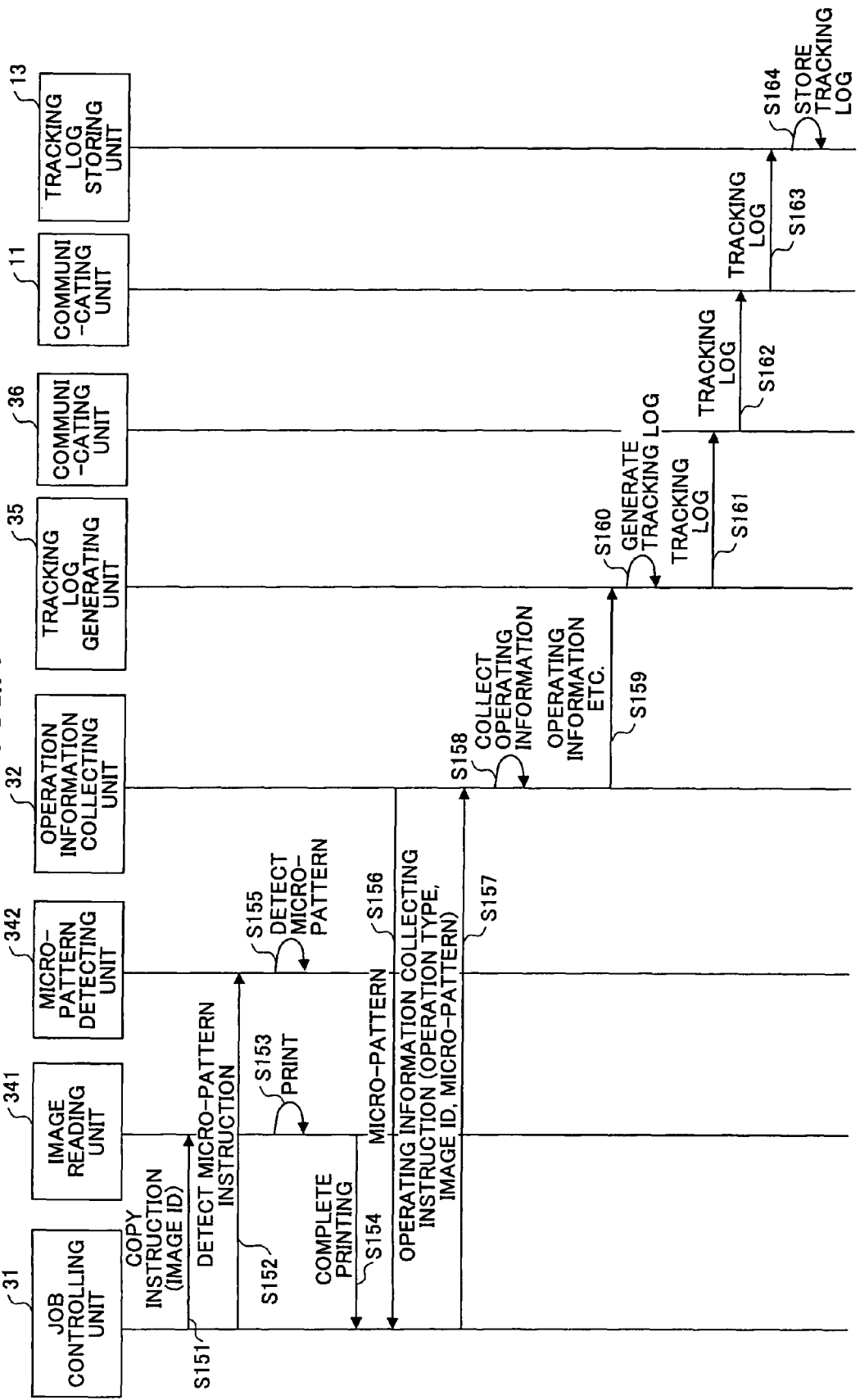
FIG. 4 is a sequence diagram showing a tracking log recording process performed by the tracking log recording system according to the first embodiment of the present invention.

In the following, the operating procedure of a tracking log recording system in FIG. 2 is explained. FIGS. 3 and 4 are sequence diagrams illustrating a recording procedure in a tracking log recording system according to a first embodiment of the present invention. FIGS. 3 and 4 illustrate a tracking log recording procedure performed when the multifunction machine 30 receives an instruction to copy a paper document. A copy job includes a scanning process of scanning an image of a paper document and a printing process of printing the scanned image onto a paper. FIGS. 3 and 4 illustrate the scanning process and printing process, respectively.

For example, when a user A sets a paper document P on the ADF or contact glass of the multifunction machine 30 and gives an instruction to copy through an operation panel (S101), the job controlling unit 31 gives an instruction to the image reading unit 331 to read the image of the paper document P (S102) and gives an instruction to the micro-pattern detecting unit 332 to detect the micro-pattern of the paper of the paper document P (S103). To respond to the instruction from the job controlling unit 31, the image reading unit 331 controls the scanner of the multifunction machine 30 to read the image of the paper document P (S104), and generates image data (hereinafter "image data A") of the image (S105). Next, the image reading unit 331 stores the image data A in a recording device such as a HDD of the multifunction machine 30 and returns the information that uniquely identifies the image data A ("image ID") to the job controlling unit 31 as the response to the instruction for reading (S106).

On the other hand, parallel to the image reading by the image reading unit 331, the micro-pattern detecting unit 332 controls the micro-pattern detector of the multifunction machine 30 to detect the micro-pattern of the paper of the paper document (S107). The micro-pattern detecting unit 332 returns the detected micro-pattern to the job controlling unit 31 as a response to the instruction to detect the micro-pattern (S108).

Next, the job controlling unit 31 informs the operating information collecting unit 32 of the data of an operation type, the image ID of the image data A read from the paper document P, and the micro-pattern detected from the paper of the paper document P (S109). The operation type corresponds to the scan of the copy functions. The operating information collecting unit 32 collects date and time information when the operation is performed, the user ID of a user who gives an instruction for the operation, and the apparatus ID of the multifunction machine 30 (S110), and informs the tracking log generating unit 35 of the above data along with the information transmitted from the job controlling unit 31 (S111). Among the operating information items, the user ID may be obtained based on the authentication function of the multifunction machine 30. Also, the apparatus ID may be the MAC address, IP address, and serial No. or the like of the multifunction machine 30.

The tracking log generating unit 35 generates a tracking log in a prescribed format based on the information (the operation type, the image ID, the micro-pattern, and the operating information) (S112), and transmits the generated tracking log to the tracking server 10 through the communicating unit 36 (S113, S114).

The communicating unit 11 of the tracking server 10, after receiving the tracking log from the multifunction machine 30, outputs the tracking log to the tracking log storing unit 13 (S115). The tacking log storing unit 13 stores the tracking log in a recording medium such as a HDD in the multifunction machine 30 (S116).

FIG. 5 shows an example of the tracking log of the scanning process. As shown in FIG. 5, a tracking log L1 includes the time (or the date and time) when the operation is performed, a name of the user who performed the operation, the micro-pattern of the paper that is a target of the operation, the operation type, and the image ID. The tracking log L1 in FIG. 5 corresponds to what is stored in step S116 in FIG. 3. Therefore, the micro-pattern "γ" in the tracking log L1 refers to the micro-pattern detected from the paper of the paper document P. The operation type "Scan(copy)" refers to the scanning process in the copy job. The image ID refers to the image ID of the image data A read from the paper document P. Symbol "γ" represents the micro-pattern for the purpose of convenience, and corresponds to the information representing its micro-pattern. Similarly, other symbols also represent each micro-pattern. The tracking log L1 may include the apparatus ID of the multifunction machine 30.

When the scanning process is completed, the job controlling unit 31 gives an instruction to print the image data A by informing the image drawing unit 341 of the image ID of the image data A (S151 in FIG. 4) and gives an instruction to the micro-pattern detecting unit 342 to detect the micro-pattern of the paper on which the image data A is to be printed (S152). To respond to the instruction from the job controlling units 31, the image drawing unit 341 obtains the image data from the recording device based on the image ID and controls the printer of the multifunction machine 30 to print the image data A onto a paper (S153). When the printing is completed, the image drawing unit 341 informs the job controlling unit 31 of the completion of printing the image data A (S154).

On the other hand, parallel to the printing of the image data A by the image drawing unit 341, the micro-pattern detecting unit 342 controls the micro-pattern detector of the multifunction machine to detect the micro-pattern of the printing paper on which the image data is to be printed (S155). The micro-pattern detecting unit 342 returns the detected micro-pattern to the job controlling unit 31 as the response to the instruction to detect the micro-pattern (S156). It does not matter whether printing the image data A onto a paper by the image drawing unit 341 or detecting the micro-pattern from a paper by the micro-pattern detecting unit 342 is performed first, and the printing and the detecting may be performed at the same time. However, it is preferable that detecting the micro-pattern on the paper be performed before printing the image data so that the micro-pattern is not affected by the toner that would otherwise be attached upon printing the image data.

Next, according to the instruction to collect the operating information, the job controlling unit 31 informs the operating information collecting unit 32 of the operation type, the image ID of the printed image data A, and the micro-pattern detected from the paper (S157). The operation type corresponds to the print in the copy operation. The operating information collecting unit 32 collects the information including the data of date and time of performing the operation, the user ID of the user who gives an instruction to perform the operation, and the apparatus ID of the multifunction machine 30 (S158) and informs the tracking log generating unit 35 of the information along with the information provided from the job controlling unit 31 (S159). Explanations of the step 160 or later are omitted since they are substantially the same as those of steps 112 through 116.

As a result of the process in FIG. 4, such a tracking log as shown in FIG. 6 is newly added to the tracking log storing unit 13 of the tracking server 10. FIG. 6 shows an example of a tracking log of the printing process. Items included in the tracking log shown in FIG. 6 are similar to those of the tracking log L1 in FIG. 5. However, the values of each item are different. Namely, symbol "ϵ" refers to the micro-pattern of the paper on which the copy of the paper document P is printed. The operation type "Print(copy)" refers to the printing process in the copy job. The image ID refers to the image ID of the image data A which is the target to be printed.

It should be noted that the reason why two separate logs of the scanning process and the printing process in one copy job are designed to be recorded is to record the fact that a user has attempted to copy even when the user scans but cannot print due to, for example, a paper jam. When two logs of scanning and printing processes are to be separately recorded, it is necessary that those two logs be associated with each other and the association be maintained. To maintain the association, for example, the job ID for the same copy job may be added to both of the tracking logs. However, there may be a paper document to be scanned including plural papers or there may be plural papers that are printed based one paper document. Further, in the tracking step explained below, it is necessary to track the association of each paper. Thus, it is preferable that tracking logs be recorded so that the copy source and the copy destination for each paper are associated with each other.

In the embodiments of the present invention, the image ID is used as the information that associates the tracking log of the scanning process with the tracking log of the printing process. Namely, in the embodiments of the present invention, when the copy sources of a paper document include plural papers or plural sets of copies from the same draft, whenever each paper is scanned and whenever each paper is printed, a tracking log may be generated and recorded. In this case, each tracking log can be associated with each paper by using the image ID of the scanned image data or the image ID of the printed image data, each recorded in each tracking log. Further, the micro-pattern may be used instead of the image ID. That is, when, instead of the image ID of a copy source, the micro-pattern of the paper of the paper document of the copy source is recorded in each tracking log, substantially the same effect can be obtained.

It will be understood that, in a copy job, without generating the tracking log in the scanning process and the tracking log in the printing process separately, a tracking log may be configured by combining both information of the copy source and information of the copy destination. In this case, since data of the copy source and the copy destination are included in the same tracking log, it is not necessary to perform processing to associate them by using the image ID.

In FIGS. 3 and 4, the explanation is made in a case where a copy job is designated. When just scanning (that is, a process of storing a paper document as electronic data) or just printing (that is, a process of printing electronic data) is designated, it is necessary to perform only one of the processes in FIGS. 3 and 4.

Figure 7:
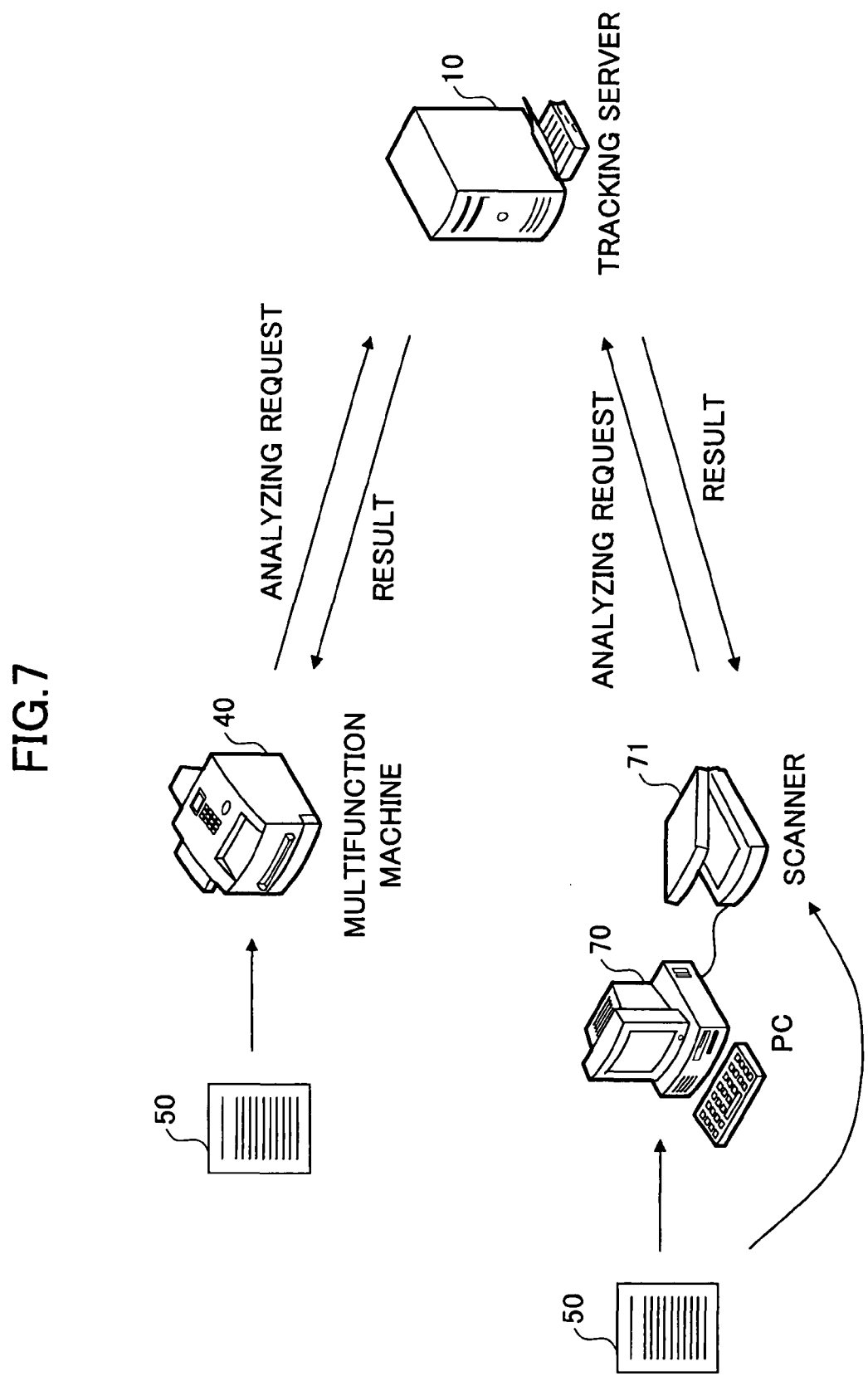
FIG. 7 is a drawing showing the outline of a tracking step.

Next, a tracking step is explained. FIG. 7 illustrates the outline of the tracking step. As explained with reference to FIG. 1, in the tracking step, in addition to the tracking server 10, it is necessary to add an apparatus including a micro-pattern detector and an outputting device that outputs the analyzed result of the distribution route of the paper document (distribution route of the information on a paper as a medium). In FIG. 7, as the apparatuses, a multifunction machine 40 having a micro-pattern detector and a PC 70 which is connected to a scanner 71 having a micro-pattern detector are exemplified. When analyzing the distribution route of the paper document 50, a user sets the paper document 50 in the multifunction machine 40 or the scanner 70 so as to detect the micro-pattern of the paper of the paper document 50. The detected micro-pattern is included in an analysis request for the distribution route to be transmitted to the tracking server 10. The tracking server 10 searches for the tracking log based on the micro-pattern included in the analysis request and analyzes the distribution route of the paper document 50. The analyzed distribution route is returned to the apparatus that requested the analysis (multifunction machine 40 or PC 70), and is displayed on the apparatus. However, the output of the result of the analysis is not limited to being displayed on a display device but may be printed out onto a paper.

BEST MODE FOR CARRYING OUT THE INVENTION

Figure 8:
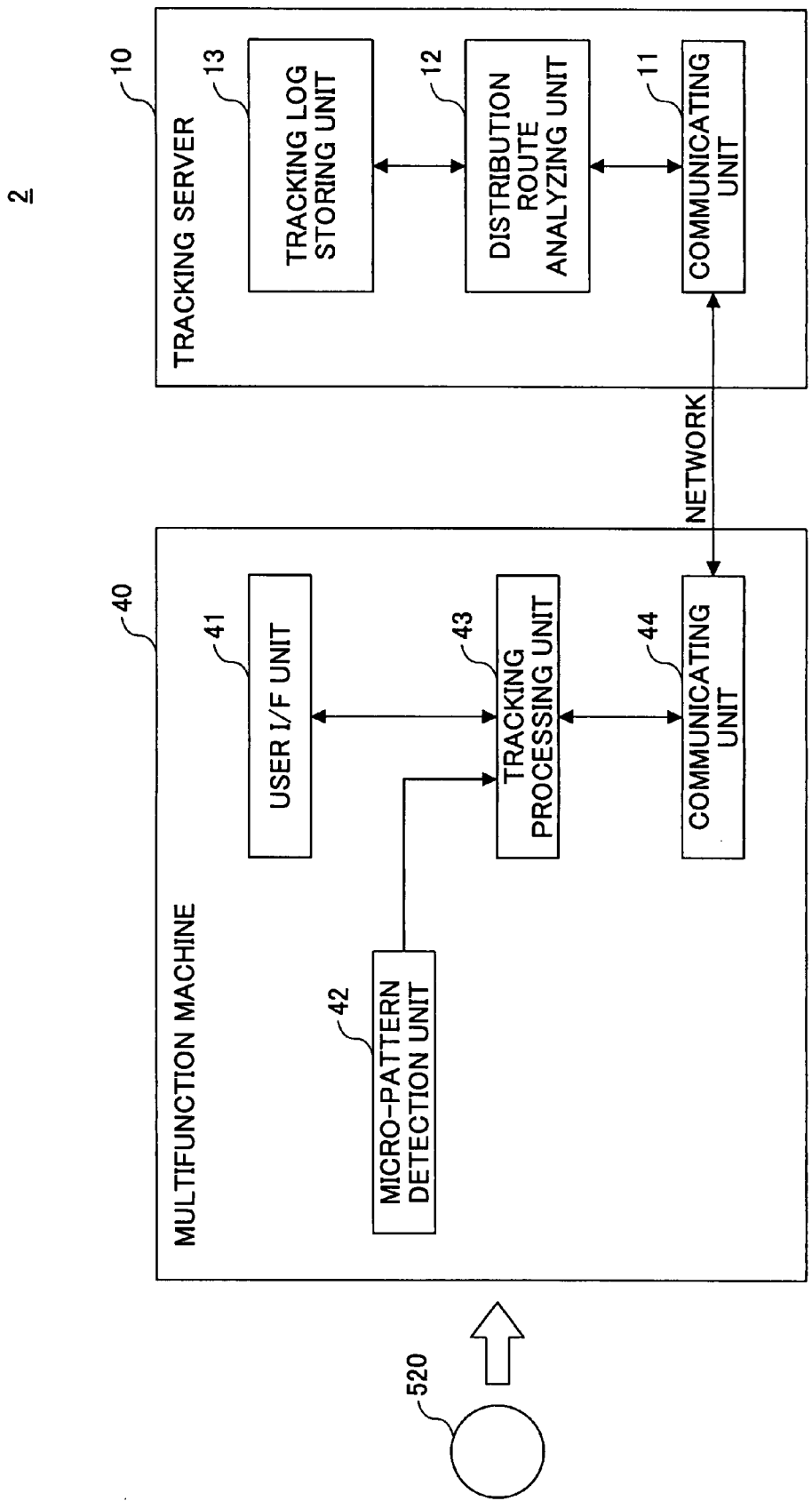
FIG. 8 is a drawing showing a sample configuration of an information tracking system that performs the tracking step according to the first embodiment of the present invention.

FIG. 8 shows a sample configuration of an information tracking system that performs the tracking step according to a first embodiment of the present invention. In FIG. 8, the same parts as in FIG. 2 have the same reference numbers and the explanation of the parts is thus omitted.

In FIG. 8, an information tracking system 2 includes one or more multifunction machines 40 and a tracking server 10 mutually connected to each other through a (wired or wireless) network such as the Internet or a Local Area Network (LAN).

The multifunction machine 40 is only an example representing an apparatus such as the multifunction machine 40, the PC 70, and the scanner 71 in FIG. 7. Namely, a multifunction machine is not always necessary as an element of the information tracking system 2, and thus the PC 70, the scanner 71 or the like may be substituted for the multifunction machine 40. In FIG. 8, the multifunction machine 40 includes a user interface (I/F) unit 41, a micro-pattern detecting unit 42, a tracking processing unit 43, and a communicating unit 44. Each of the units can be operated when a program installed in the multifunction machine 40 is executed by the CPU of the multifunction machine 40. The program may be downloaded through a network or may be installed using a recording medium 520 such as a CD-ROM and a SD memory card.

The user interface unit 41 controls the input and output of the information through the operation panel of the multifunction machine 40. The micro-pattern detecting unit 42 controls a micro-pattern detector of the multifunction machine 40 and detects the micro-pattern of the paper of the paper document whose distribution route is to be analyzed. The tracking processing unit 43 generates a message (analysis request) requesting the analysis of a distribution route to the tracking server 10 and performs some processes including displaying the analyzed result returned from the tracking server 10 as a response to the analysis request. The communicating unit 44 controls the communications with the tracking server 10.

Figure 9:
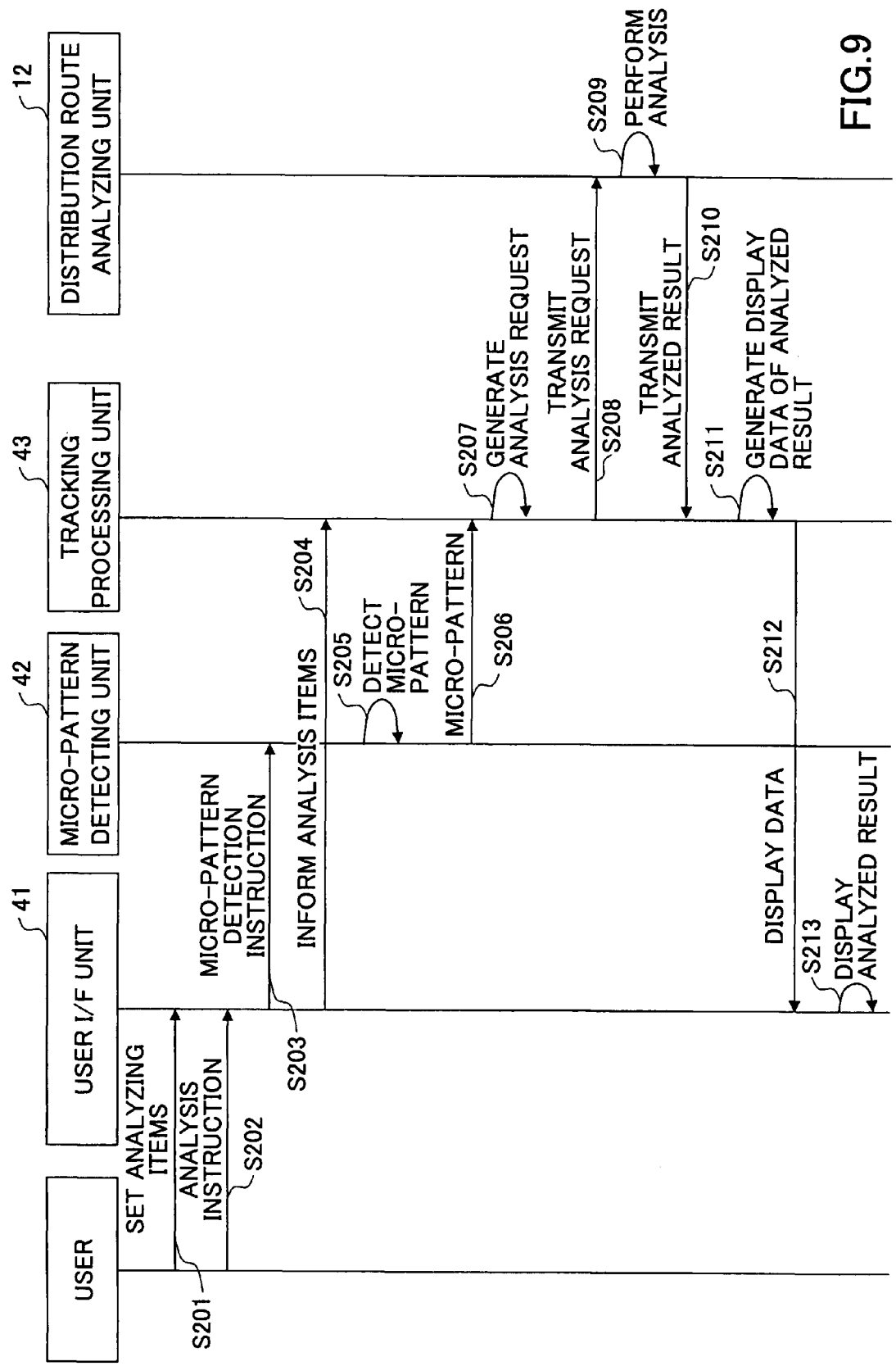
FIG. 9 is a sequence diagram showing a distribution route analyzing process performed by the information tracking system according to the first embodiment of the present invention.

FIG. 9 is a sequence diagram showing a distribution route analyzing process performed by an information tracking system according to the first embodiment of the present invention.

When a user sets an analyzing item of the distribution route through the operation panel of the multifunction machine 40, the user interface unit 41 holds the set item (S201). The analyzing items of the distribution route include the range of the distribution route to be analyzed, that is, for example, whether the source or the destination of the paper document to be analyzed (hereinafter "paper document P") is to be analyzed or both of them are to be analyzed.

Next, when a user sets the paper document P on the ADF or contact glass of the multifunction machine 40 and gives an instruction to analyze the distribution route through the operation panel (S202), the user interface unit 41 gives an instruction to the micro-pattern detecting unit 42 to detect the micro-pattern of the paper document P (S203). Also, the user interface unit 41 outputs the analyzing items set by the user to the tracking processing unit 43 (S204). According to the instruction from the user interface 41, the micro-pattern detecting unit 42 controls a micro-pattern detector of the multifunction machine 40 to detect the micro-pattern of the paper document P (S205) and outputs the detected micro-pattern to the tracking processing unit 43 (S206).

Next, the tracking processing unit 43 generates an analysis request including the analyzing items output from the user interface unit 41 and the micro-pattern detected by the micro-pattern detecting unit 42 (S207), and transmits the analysis request to the tracking server 10 through the communicating unit 44 (S208). In FIG. 9, the communicating unit 44 and the communicating unit 11 are omitted for the purpose of convenience.

After receiving the analysis request, the communication unit 11 of the tracking server 10 outputs the analysis request to the distribution route analyzing unit 12. In accordance with the analysis request, the distribution route analyzing unit 12 analyzes the distribution route using the tracking logs (S209). The analyzed result of the distribution route is returned to the multifunction machine 40 (S210). Details of the analyzing process of the distribution route are explained below.

The tracking processing unit 43 of the multifunction machine 40 generates display data (or a display command) to display the returned analyzed result so that the user can easily check the result (S211), and outputs the display data to the user interface unit 41 (S212). Based on the display data, the user interface unit 41 displays the analyzed result on the operation panel of the multifunction machine 40 (S213).

Figure 10:
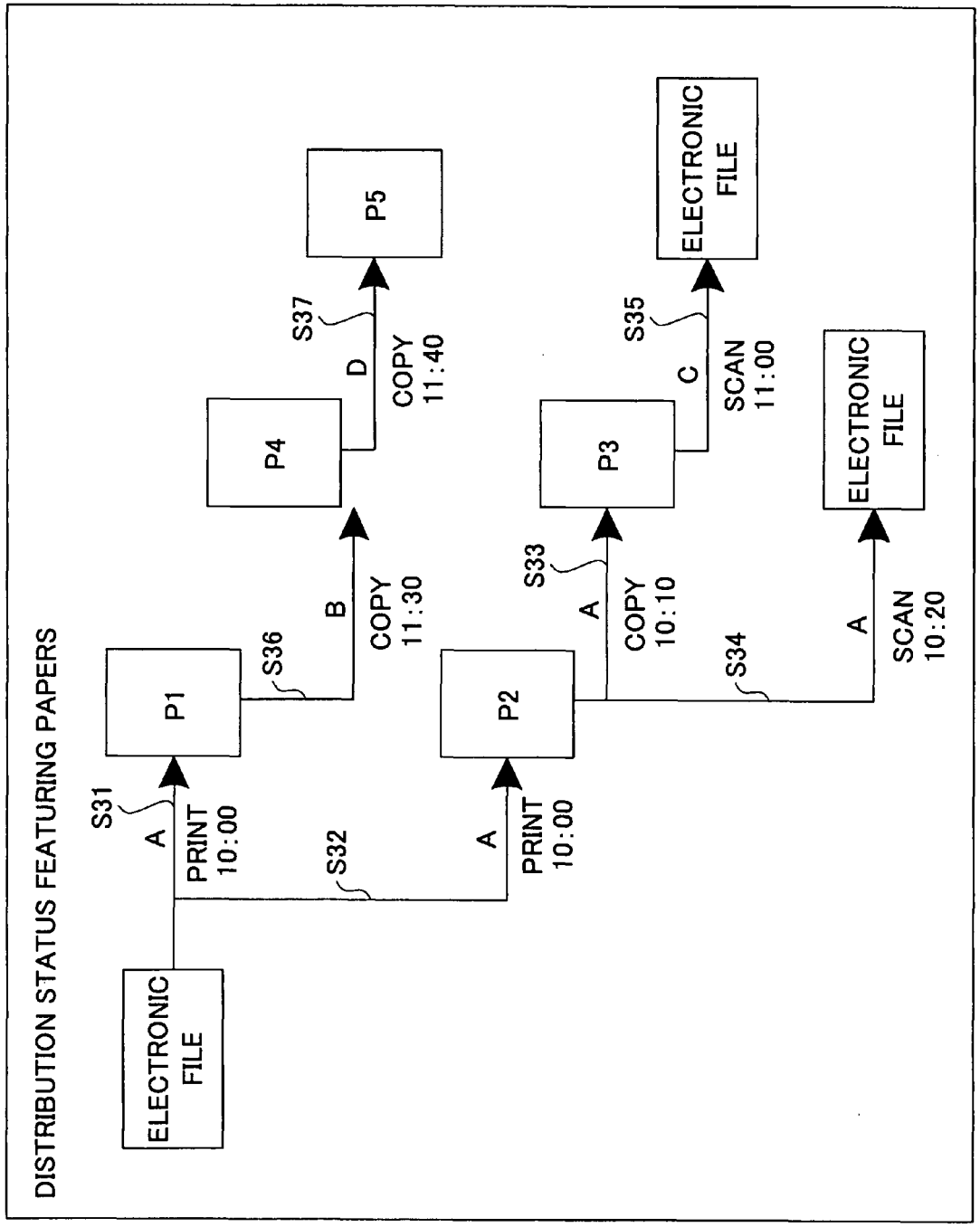
FIG. 10 is a drawing showing a first display example of an analyzed result of the distribution route.

FIG. 10 shows a first display sample of the analyzed result of the distribution route. The display sample in FIG. 10 illustrates the following analyzed result. In the figure, symbols A through D denote users, and symbols P1 through P5 denote paper documents.

First, at 10:00, a user A prints two paper documents P1 and P2 from an electronic file (S31, S32). At 10:10, the user A copies from the paper document P2 to create a paper document P3, and the paper document P3 is passed to a user C (S33). At 10:20, the user A scans and digitizes the paper document P2 (S34). At 11:00, the user C scans and digitizes the paper document P3 (S35). At 11:30, a user B copies the paper document P1 to create a paper document P4, and the paper document p4 is passed to a user D (S36). At 11:40, the user D copies the paper document P4 to create a paper document P5 (S37).

As shown in the figure, the distribution route is indicated in a tree structure, allowing a user to check the distribution route adequately.

Figure 11:
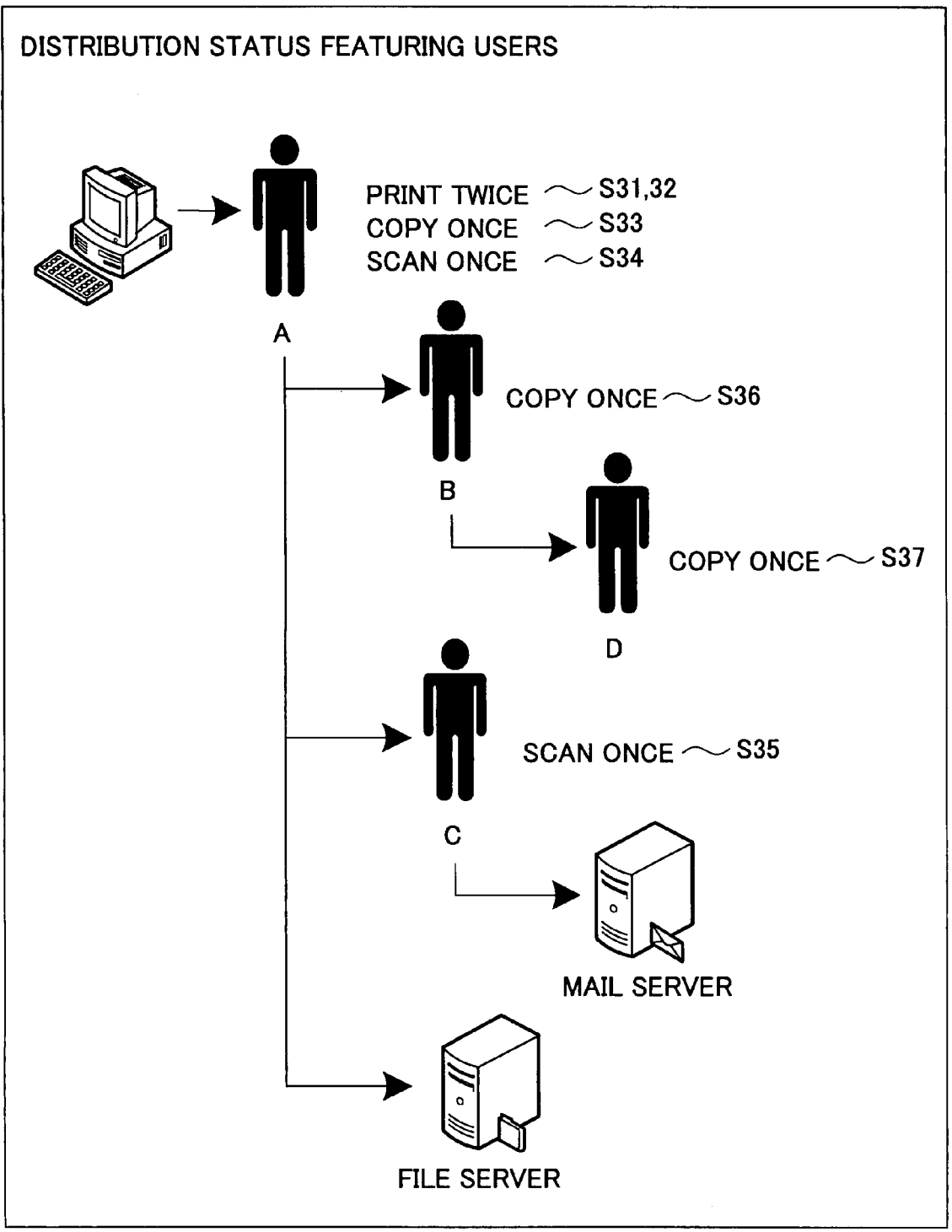
FIG. 11 is a drawing showing a second display example of the analyzed result of the distribution route.

The analyzed result may be displayed as shown in FIG. 11. FIG. 11 shows a second display sample of the analyzed result of the distribution route. The display sample in FIG. 11 shows the same analyzed result as in FIG. 10 but is viewed from a different standpoint. Namely, FIG. 10 shows an example when the analyzed result is seen from the viewpoint of the papers and the distribution flow of the papers, while FIG. 11 shows an example when the analyzed result is seen from the viewpoint of the users and the operations of the users. The step Nos. S31 through S37 in FIG. 11 correspond the same step Nos. in FIG. 10.

As shown in FIGS. 10 and 11, the analyzed result has a tree structure. Therefore, the analyzed result by the distribution route analyzing unit 12 may be displayed based on, for example, the XML (extensible Markup Language).

Next, details of the analyzing process of a distribution route in step S209 in FIG. 9 are explained. As an example, a case where the tracking logs as shown in FIG. 12 are stored in the recording device of the tracking server 10 is explained.

Figure 12:
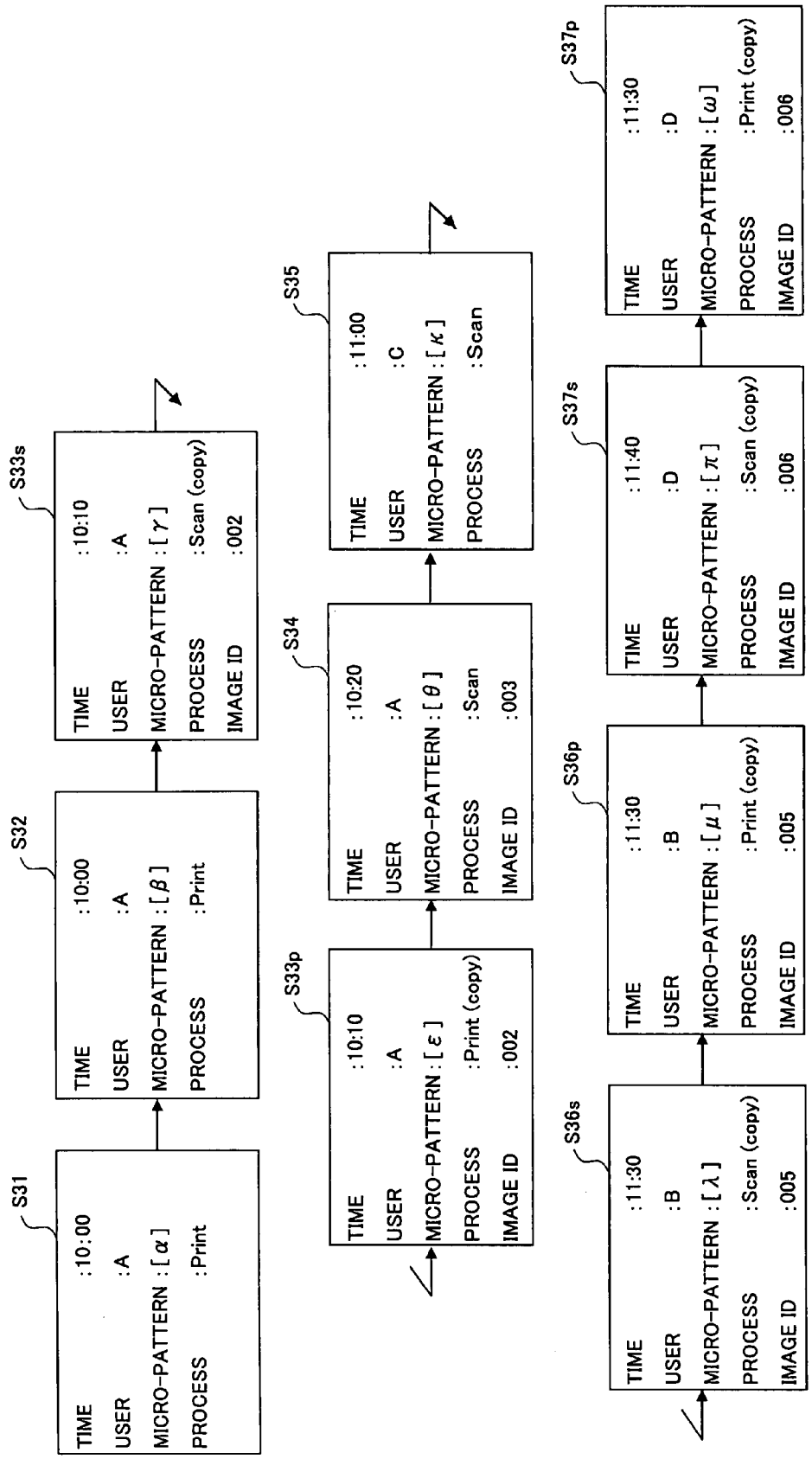
FIG. 12 is drawing showing an example of the tracking logs for explaining the analyzing process of the distribution route.

FIG. 12 shows some sample tracking logs to explain the analyzing process of the distribution route. The analyzed results in FIGS. 10 and 11 are based on the tracking logs in FIG. 12. Therefore, each tracking log in FIG. 12 has its step No. the same as the corresponding step No. in FIGS. 10 and 11. It should be noted that, in the embodiment, in a copy job, the tracking logs of its scanning process and printing process are separately generated. Therefore, as the tracking log for step S33 in, for example, FIG. 10, a tracking log S33$s$ of its scanning process and a tracking log S33$p$ of its printing process are stored. This applies to the copy operations in steps S36 and S37 as well. Arrows in the figure shows the time axis. Namely, the tracking logs are arranged in time series.

In a case where the tracking logs in FIG. 12 are stored, the distribution route of the paper document P4 is analyzed as below. In this case, the micro-pattern (hereinafter "$\eta$") detected from the paper of the paper document P4 by the micro-pattern detecting unit 42 of the multifunction machine 40 is included in the analysis request and is transmitted to the tracking route analyzing unit 12 of the tracking server 10. After receiving the analysis request, the distribution route analysis unit 12 searches for a tracking log having the micro-pattern data that has a strong correlation with the "$\eta$" from among the tracking logs stored in the tracking log storing unit 13.

Among the tracking logs in FIG. 12, the micro-patterns "$\mu$" and "$\pi$" recorded in the tracking logs 36$p$ and 37$s$, respectively, should have a strong correlation with the micro-pattern "$\eta$". This is because the micro-pattern "$\mu$" of the tracking log S36$p$ is detected from the paper of the paper document P4 when the paper document P4 is being printed as the copy destination and the micro-pattern "$\pi$" of the tracking log S37$s$ is detected from the paper of the paper document P4 when the paper document P4 is being scanned as the copy source.

It should be noted that even if a micro-pattern is detected from the same part of the same paper, each micro-pattern is apt to be different from others that are detected separately but there should be a strong correlation among the micro-patterns as long as the micro-patterns are detected from the same part of the same paper (refer to Reference Document 1). Accordingly, the micro-patters "$\eta$", "$\mu$", and "$\pi$" detected from the same part of the same paper document P4 show a strong correlation among each other. When determining whether two micro-patters are detected from the same paper by using the strength of correlation, the criterion of the determination may be based on a prescribed threshold value. For example, two papers are regarded as the same when the correlation peak of the two papers is equal to or more than 0.6.

According to the analysis request, when a target to be analyzed is the "source" of a paper document, first, the tracking log having the same image ID as the image ID ("005") that is recorded in the tracking log S36$p$ corresponding to the outputting (printing) process of the paper document P4 is searched for by tracking the route back to the source direction. In this case, the image ID of the tracking log S36$s$ is "005", and this is identical. To track back further in the source direction, the tracking log having the micro-pattern which has the strong correlation with the micro-pattern "$\lambda$" recorded in the tracking log S36$s$ is searched for by tracking the route back to the source direction (From FIG. 10, the micro-pattern "$\lambda$" corresponds to the micro-pattern detected from the paper of the paper document P1.). As a result, the search reaches the tracking log S31 having a micro-pattern "$\alpha$" detected from the paper of the paper document P1 when the paper is printed from an electronic file. Thus, a fact (distribution route) that "the paper document P4 is generated when a user B copies from the paper document P1 which is printed from an electronic file by a user A" is proved.

According to the analysis request, when a target to be analyzed is, for example, the "destination" of a paper document, it is necessary to trace tracking logs from old to new starting with the tracking log 37$s$ which corresponds to a process occurring after the paper document P4 is generated. According to an example in FIG. 12, since the image ID of the tracking log S37$p$ is the same as the image ID of the tracking log S37$s$, a fact (distribution route) that "the paper document P4 is copied by a user D, and the process was succeeds so that a paper having a micro-pattern "$\omega$" is generated" is proved.

According to the analysis request, when a target to be analyzed is, for example, the distribution routes of all papers in both "source" and "destination" directions, it is necessary to trace tracking logs to search in both directions, from old to new and from new to old, as explained above, starting with the paper document P4. As a result, the analyzed result shown in FIGS. 10 and 11 is obtained.

Figure 13:
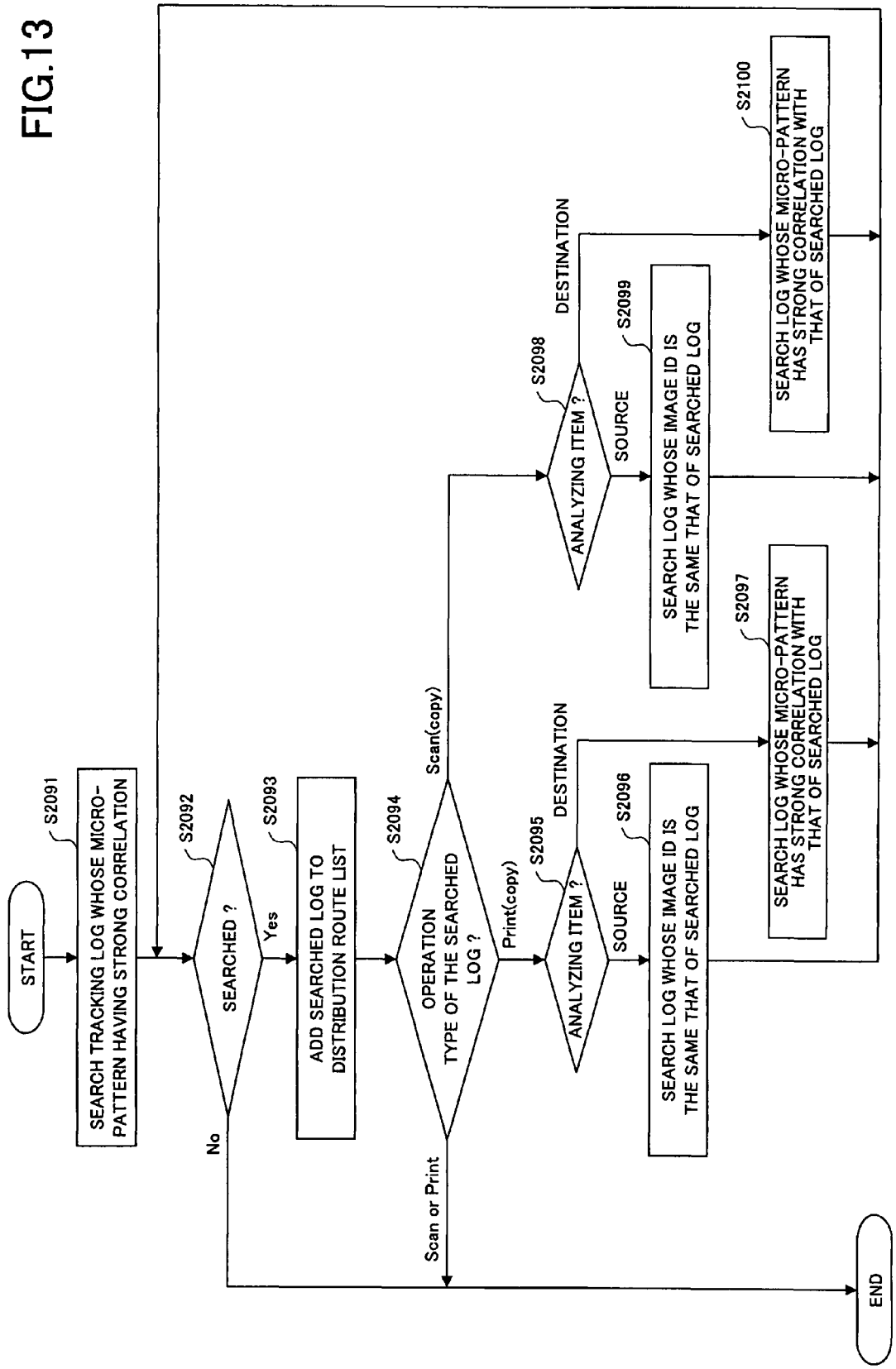
FIG. 13 is a flow chart illustrating the analyzing process of the distribution route.

The processes explained with reference to FIG. 12 can be generalized into the diagram shown in FIG. 13. FIG. 13 is a flowchart of the analyzing process of the distribution route. Namely, in step S209 in FIG. 9, the distribution route analyzing unit 12 performs the process as shown in FIG. 13.

First, the tracking log having the micro-pattern which has the strong correlation with the micro-pattern included in the analysis request is searched for (S2091). When the tracking log is located (Yes at S2092), the information recorded in the located tracking log is added to the distribution route as the analyzed result (S2093). Then the operation type of the located tracking log is determined (S2094).

When the operation type is "Print(copy)" (printing process in the copy job), and the requested analyzing item includes the source ("Source" at S2095), the tracking logs having the same image ID as the image ID recorded in the located tracking log are searched for by tracing the tracking logs from new to old (S2096). In this case, it is necessary to search for the paper of the copy source because, in this embodiment, the copy source and the copy destination are associated with each other by the image ID. On the other hand, when the requested analyzing item includes the destination ("destination" at S2095), the tracking logs having the micro-pattern which has a strong correlation with the micro-pattern recorded in the located tracking log are searched for by tracing the tracking logs from old to new (S2097). In this case, when the copied paper is further scanned (including copied), there should exist a tracking log having the micro-pattern of the paper. When the request analyzing item includes both "source" and "destination", both processes branched at step S2095 are performed with respect to the located tracking log. When a tracking log is located in step S2096 or S2097 (Yes at S2092), the process after step 2093 as explained above is recursively repeated with respect to each of the located tracking logs.

In step S2094, when the operation type is "Scan(copy)" (scanning process in the copy job), and the requested analyzing item includes the source ("source" at S2098), the tracking logs having the micro-pattern which has the strong correlation with the micro-pattern recorded in the located tracking log are searched for by tracing the tracking logs from old to new (S2099). On the other hand, when the requested analyzing item includes the destination ("destination" at S2098), the tracking logs having the same image ID as the image ID recorded in the searched tracking log are searched for by tracing the tracking logs from old to new (S2100). When the request analyzing item includes both "source" and "destination", both processes branched at step S2098 are performed with respect to the located tracking log. When a tracking log is located in step S2099 or S2100 (Yes at S2092), the process after step 2093 as explained above is recursively repeated with respect to each of the located tracking logs.

When no tracking log is located in step S2092 (No at S2092) or the operation type of the located tracking log in step 2094 is either "Scan" (only scanning without copying) or "Print" (only printing without copying), the analysis of distribution route of the tracking log to be analyzed is terminated.

As explained above, in the tracking log system 1 and the information tracking system 2 according to the first embodiment of the present invention, the distribution route of a paper document is analyzed based on not the information (contents) formed on the paper document but the identification information (micro-pattern) included in its paper before the information is formed on the paper of the paper document. Therefore, it is possible to accurately get the distribution route information of a document including which printer printed out the document, which multifunction machine copied the document, and which scanner scanned the document for each paper, thereby enabling analysis and preventing an information leakage incident.

In above explanation, an example in which the micro-pattern is used as the lasting identifier that is previously included in each paper to identify the paper is explained. However, any other information that enables identifying each paper may be used. For example, when a paper including a random pattern of metal fiber or a paper including a RFID data that enables uniquely identifying the paper is used, the pattern or the RFID data can be used as the identifier of the paper. In this case it is not necessary to use a cross-correlation function when the distribution route is analyzed and it is only necessary to search for a tracking log having the same identifier.

Next, a second embodiment of the present invention is explained. In the second embodiment, when a paper document is printed, an identifier (hereinafter "paper ID") is embedded in the paper document. An example to trace the paper document using the paper ID is explained. In the explanation of the second embodiment, items different from the first embodiment are mainly explained. That is, it should be noted that the points which are not explicitly explained in the second embodiment are the same as in the first embodiment.

Figure 14:
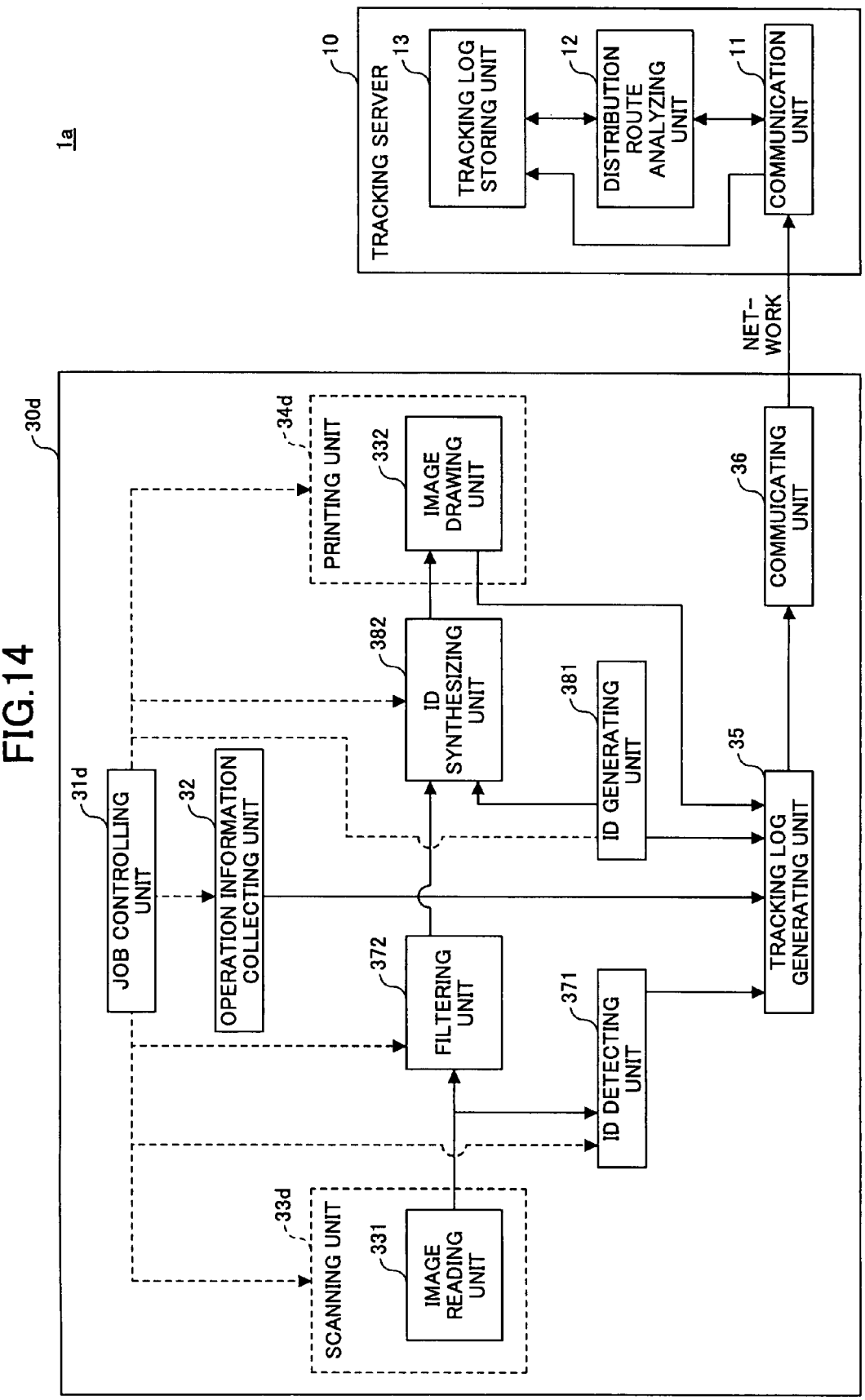
FIG. 14 is a drawing showing a sample configuration of the tracking log recording system that performs a recording step according to a second embodiment of the present invention.

FIG. 14 shows a sample configuration of a tracking log recording system that performs the recording step according to the second embodiment of the present invention. In FIG. 14, the same parts as in FIG. 2 have the same reference numbers and the explanation of the parts is omitted.

In FIG. 14, a multifunction machine 30d is different from the multifunction machine 30 in FIG. 2 in that the multifunction machine 30d includes an ID detecting unit 371, a filtering unit 372, an ID generating 381, and an ID synthesizing unit 382. In addition, a scanning unit 33d and a printing unit 34d in the multifunction machine 30d do not include the micro-pattern detecting unit 332 and 342, respectively.

The ID detecting unit 371 detects a paper ID from the image data read by the image reading unit 331 from a paper document. The paper ID is embedded in a paper document as, for example, a woven pattern (dot pattern). The paper ID is defined according to the arrangement of the woven pattern. Image data read by the image reading unit 331 from a paper document include the woven pattern, and the ID detecting unit 371 detects the woven pattern and determines the paper ID based on the woven pattern. As a method of embedding the ID into a paper, for example, a method disclosed in Japanese Patent Application Publication No. 2005-38372 may be used.

The filtering unit 372 removes woven patterns embedded in the image data read by the image reading unit 331 by using, for example, an image processing technique that removes the background. Namely, the woven pattern or the like used as the paper ID in this embodiment is made of, for example, small dots or a light color so as to be removed by a process to remove high luminance component data.

The ID generating unit 381 generates the paper ID that uniquely identifies each paper. The paper ID may be generated by, for example, a server that uniformly manages the paper ID process or may be combined with other information that uniquely identifies an apparatus (for example, MAC address) to prevent generating the same ID when the same contents of data are printed using plural apparatuses.

The ID synthesizing unit 382 synthesizes the image data where the woven pattern has been removed by the filtering unit 371 with a paper ID generated by the ID generating unit 381.

Figure 15:
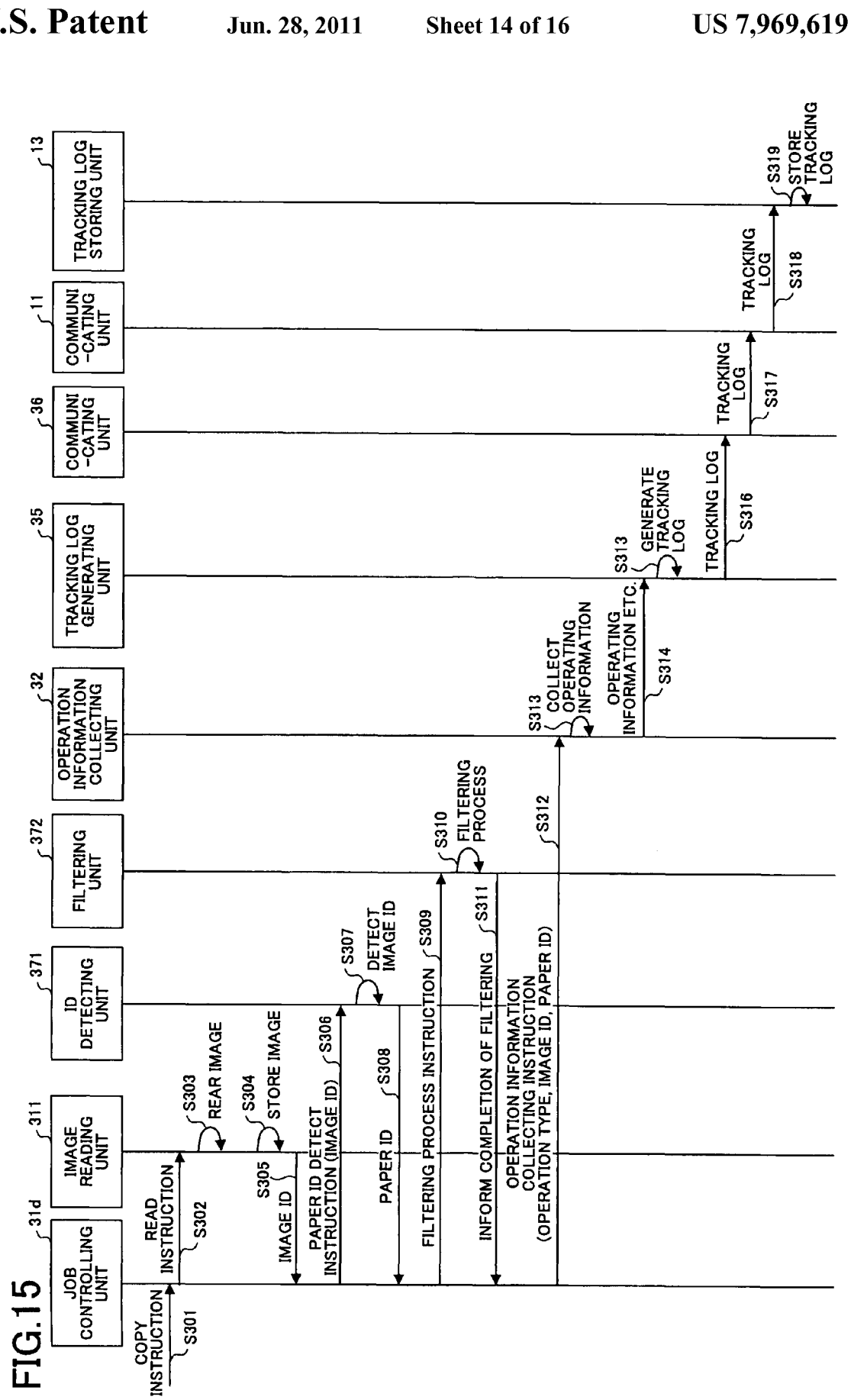
FIG. 15 is a sequence diagram showing a tracking log recording system of the tracking log recording system according to the second embodiment of the present invention.
Figure 16:
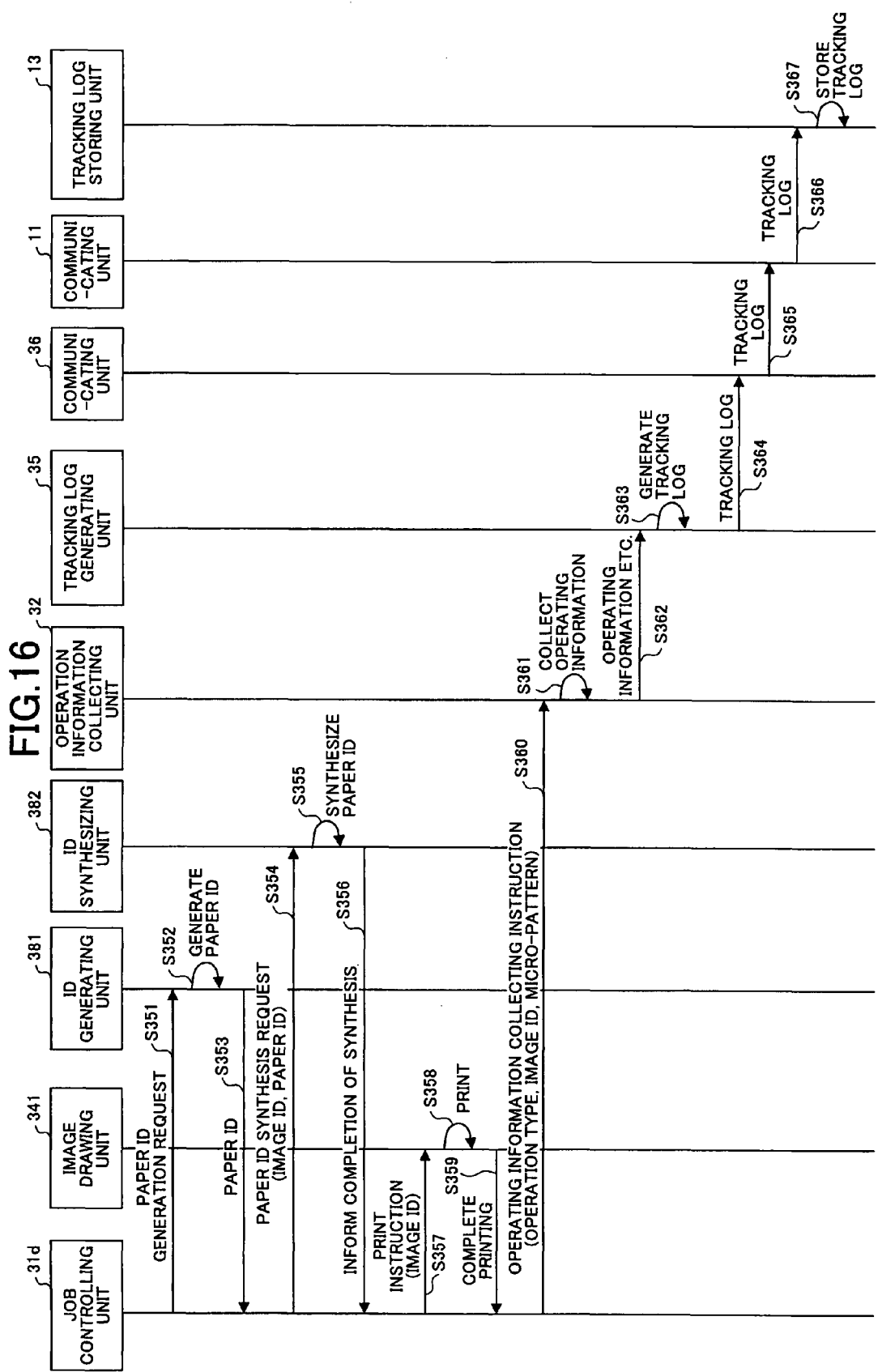
FIG. 16 is a sequence diagram showing a tracking log recording system of the tracking log recording system according to the second embodiment of the present invention.

In the following, the operating process of a tracking log recording system shown in FIG. 14 is explained. FIGS. 15 and 16 are sequence diagrams illustrating the tracking log recording process in the tracking log recording system according to the second embodiment of the present invention. In FIGS. 15 and 16, the same as in the first embodiment of the present invention, a tracking log recording process is explained that is performed when a copy job of the paper document is designated. As the components of the copy job, the scanning and printing processes are shown in FIGS. 15 and 16, respectively.

For example, when a user A sets a paper document P on the ADF or contact glass of the multifunction machine 30 and gives an instruction to copy through an operation panel (S301), the job controlling unit 31d gives an instruction to the image reading unit 331 to read the image of the paper document P (S302). To respond to the instruction from the job controlling unit 31d, the image reading unit 331 controls the scanner of the multifunction machine 30 to read the image of the paper document P (S303) and generates the image data (hereinafter "image data A") representing the image (S304). Next, the image reading unit 331 stores the image data A onto a recording device such as HDD in the multifunction machine 30, and returns the image ID of the image data A to the job controlling unit 31d as the response to the reading instruction (S305).

Next, the job controlling unit 31*d* informs the ID detecting unit 371 of the image ID of the image data A, and sends a request to the ID detecting unit 371 to detect the paper ID from the image data A (S306). The ID detecting unit 371 detects the woven pattern from the image data A stored in the recording device based on the image ID, and determines the paper ID based on the detected information (S307). The ID detecting unit 371 returns the determined paper ID to the job controlling unit 31*d* (S308).

Next, the job controlling unit 31*d* informs the filtering unit 372 of the image ID of the image data A, and sends a request to the filtering unit 372 to remove the woven pattern embedded in the image data A (S309). The filtering unit 372 removes the woven pattern from the image data A stored in the recording device (S310) and informs the job controlling unit 31*d* of the completion of the requested process (S311).

Next, according to the instruction to collect the operating information, the job controlling unit 31*d* informs the operating information collecting unit 32 of the operation type, the image ID of the image data A, and the paper ID detected from the image data A (S312).

After the above steps, since the steps S313 through S319 are the same as the steps S110 through S116 in the first embodiment (FIG. 16) except that the micro-pattern is replaced by the paper ID, the explanation of the steps is omitted. Accordingly, the tracking log stored in step S116 corresponds to the tracking log stored in step S319 except that the micro-pattern is replaced by the paper ID.

When the scanning is completed, the job controlling unit 31*d* starts a printing process of the copy source (FIG. 16). First, the job controlling unit 31*d* sends a request to the ID generating unit 381 to generate a new paper ID (S351). The ID generating unit 381 generates a unique paper ID (S352) and returns the paper ID to the job controlling unit 31*d*.

Next, the job controlling unit 31*d* informs the ID synthesizing unit 382 of the image ID of the image data A where the woven pattern embedded in the paper document P is removed and a newly generated paper ID, and sends a request to the ID synthesizing unit 382 to synthesize the paper ID with the image data A (S354). The ID synthesizing unit 382 generates the woven pattern representing the paper ID and synthesizes the woven pattern with the image data A (S355). When the synthesis is completed, the ID synthesizing unit 382 informs the job controlling unit 31*d* of the completion of the synthesis (S356).

Next, the job controlling unit 31*d* informs the image drawing unit 341 of the image ID of the image data A to print the image data A. (S357). The image drawing unit 341 controls the printer of the multifunction machine 30 to print the image data A onto a paper (S358). When the printing is completed, the image drawing unit 341 informs the job controlling unit 31*d* of the completion of printing the image data A (S359). In this case, in the printed paper, the paper ID embedded in the paper document P is removed and a newly generated paper ID is embedded. Namely, the paper ID of the paper of the copy source becomes different from the paper ID of the paper of the copy destination and thus each paper has its own unique paper ID. However, it should be noted that the paper ID embedded in the scanned paper is not necessarily removed. For example, a newly generated pattern may be added to the woven pattern of the copy source to generate a different paper ID.

Next, according to the instruction to collect the operating information, the job controlling unit 31*d* informs the operating information collecting unit 22 of the operation type, the image ID of the printed image data A, and a newly generated paper ID (S360).

After the above steps, since the steps S361 through S367 are the same as the steps S158 through S164 except that the micro-pattern is replaced by the paper ID, the explanation of the steps is omitted. Accordingly, the tracking log stored in step S164 corresponds to the tracking log stored in step S367 except that the micro-pattern is replaced by the paper ID.

Figure 17:
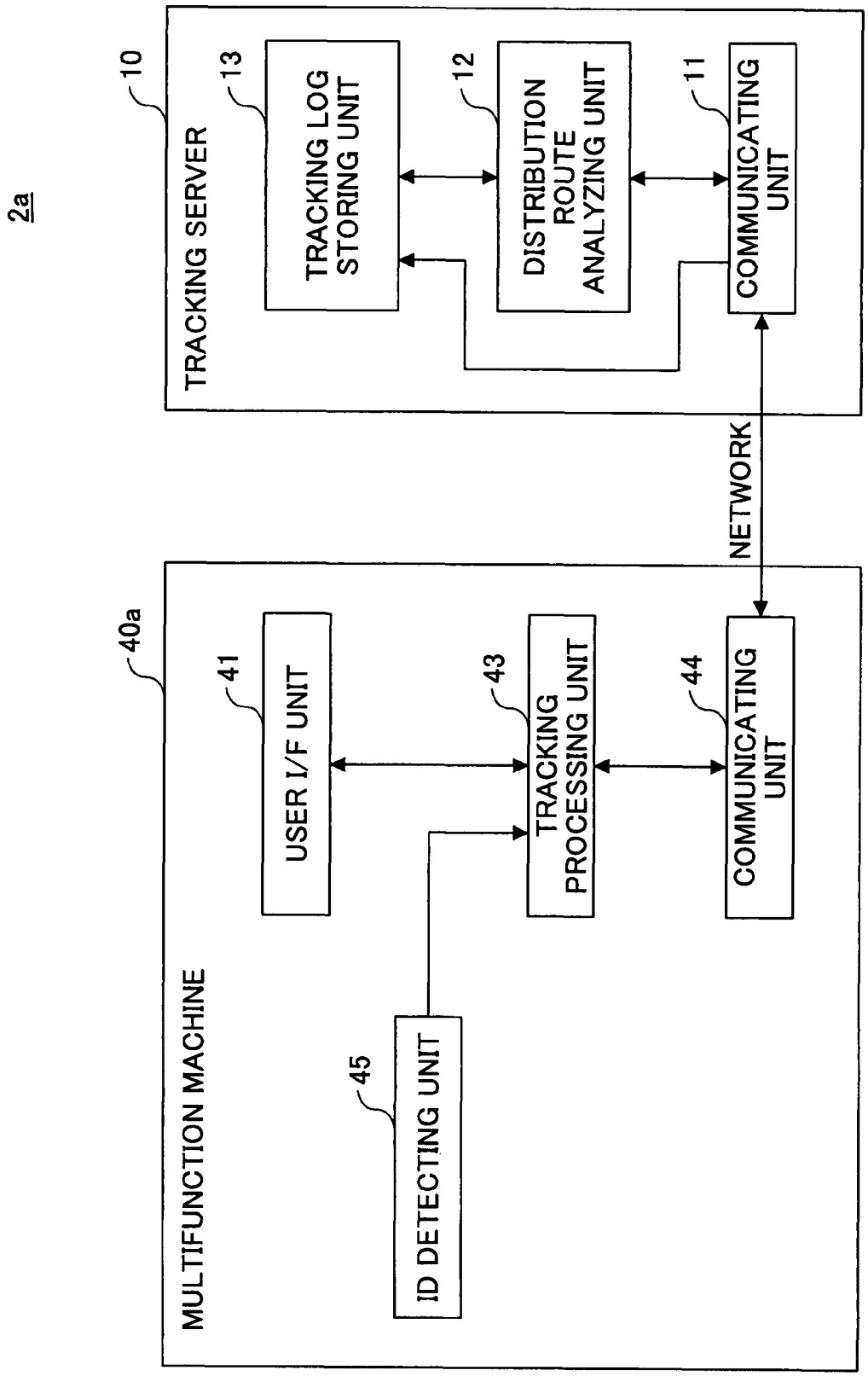
FIG. 17 is a drawing showing a sample configuration of the information tracking system that performs a tracking step according to the second embodiment of the present invention.

Next, the tracking step in the second embodiment of the present invention is explained. FIG. 17 shows a sample configuration of the information tracking system that performs the tracking step in the second embodiment of the present invention. In FIG. 17, the same parts as in FIG. 8 have the same reference numbers and the explanation of the parts is omitted.

In FIG. 17, the multifunction machine 40*a* is different from the multifunction machine 40 in FIG. 8 in that the multifunction machine 40*a* includes the ID detecting unit 45 instead of the micro-pattern detecting unit 42. The ID detecting unit 45 detects the paper ID (such as the woven pattern) of the paper of the paper document whose distribution route is a target to be analyzed.

The explanation of the distribution route analyzing process in the second embodiment is omitted since the distribution route analyzing process in the second embodiment is the same as that in the first embodiment except that the micro-pattern detection unit 42 is replaced by the ID detecting unit 45 and the micro-pattern is replaced by the paper ID. In the second embodiment, since the paper ID is used as the identifier of a paper, whether a paper is the same as or different from the other paper is determined based on not the strength of the correlation between the papers but the values of the paper IDs of those papers.

As explained above, in the tracking log recording system 1*a* and the information tracking system 2*a* according to the second embodiment of the present invention, since a unique paper ID can be embedded into each paper when the paper is printed, it is possible to uniquely distinguish each paper. Therefore, the similar effect as that in the first embodiment can be obtained when the paper ID is used as the identifier of a paper.

In the explanations of the first and second embodiments, the tracking log recording system and the information tracking system are assumed to be different from each other. However, the multifunction machine 30 or 40 configuring both systems may be the same. Further, in the explanation of the embodiments, each system includes plural apparatuses. However the configuration that carries out the embodiments is not so limited. Namely, for example, there may be a configuration where only one multifunction machine has the functions of recording the tracking logs and analyzing the distribution route and performs those functions within the multifunction machine. In this case, only the distribution route of the paper that is scanned or printed in the multifunction machine can be obtained, but this configuration may be effective in, for example, a small office environment where a tracking server and plural multifunction machines are not necessary.

In addition, in the tracking log recording system 1 or 1*a* explained in the first and second embodiments, the tracking server 10 may be configured to monitor the contents of tracking logs so as to detect an inappropriate operation of the document paper in real time. Namely, the tracking server 10 determines if an appropriate operation (for example, an abnormal amount of copying and the transmission of scanned data to an external destination) is being performed based on the tracking log received at the tracking sever. When the operation is determined to be inappropriate, the tracking server 10 may transmit an e-mail to a mail address of a document administrator previously registered to inform the administrator of the occurrence of the situation.

The distribution route analyzed by the embodiments of the present invention may be used for a purpose other than the security purpose. For example, the system may be used to determine whether the document to be distributed is passed to a person who should receive the document.

The present invention is not limited to the above-mentioned embodiments, and variations and modifications may be made without departing from the scope of the present invention.

The present application is based on and claims the benefit of priority of Japanese patent application No. 2006-216127, filed on Aug. 8, 2006, the entire contents of which are hereby incorporated by reference.

What is claimed is:

1. A computer-executable information tracking method, comprising:
   a first detecting step of, whenever an input or an output of information is performed using a paper as a medium, detecting paper identification information, uniquely identifying the paper, from the paper;
   a storing step of associating the paper identification information with information regarding the input or the output of the information and storing the paper identification information and the information regarding the input or the output of the information in a recording device;
   a second detecting step of detecting the paper identification information of a designated paper to detect the information regarding the input or the output of the information from the designated paper; and
   an information searching step of searching for information regarding the input or the output of the information of the designated paper by comparing the paper identification information of the designated paper with the paper identification information stored in the recording device, wherein:
   in the first detecting step, when information is copied from an original or copied to a copy using a paper as a medium, both the paper identification information of the original and the paper identification information of the copy are detected;
   in the storing step, the paper identification information of the original and the paper identification information of the copy are associated with each other and then stored; and
   in the information searching step, based on the association of the paper identification information of the original and the paper identification information of the copy, information regarding the input or the output of the information of the original and the copy of the designated paper is further searched for.

2. The information tracking method according to claim 1, the method further comprising:
   an outputting step of outputting a searched result obtained in the information searching step to an outputting device.

3. The information tracking method according to claim 1, wherein:
   in the information searching step, by comparing the paper identification information of the original or the paper identification information of the copy with the other paper identification information stored in the recording device, information regarding the input or the output of the information of the original of the original or information regarding the input or the output of the information of the copy of the copy is further searched for.

4. The information tracking method according to claim 1, wherein:
   the information regarding the input or the output of the information includes information that identifies a user who gives an instruction for the input or the output.

5. The information tracking method according to claim 1, wherein:
   the paper identification information is originally possessed in the paper.

6. A computer-executable information tracking method, comprising:
   a first detecting step of, whenever an input of information is performed using a paper as a medium, detecting paper identification information, synthesized within the information and uniquely identifying the paper, from the information;
   an outputting step of, whenever an output of information is performed using a paper as a medium, synthesizing and outputting the paper identification information for the paper to be output with the information;
   a storing step of associating the paper identification information with information regarding the input or the output of the information and storing the paper identification information with the information regarding the input or the output of the information in a recording device;
   a second detecting step of detecting the paper identification information of a designated paper to detect the information regarding the input or the output of the information from the designated paper; and
   an information searching step of searching for information regarding the input or the output of the information of the designated paper by comparing the paper identification information of the designated paper with the paper identification information stored in the recording device, wherein:
   in the first detecting step, when information is copied from an original or copied to a copy using a paper as a medium, the paper identification information synthesized within the information of the original is detected;
   in the outputting step, when the information is copied from an original or copied to a copy using a paper as a medium, the paper identification information of the copy is synthesized with the information, and the paper identification information of the copy and the information are output;
   in the storing step, the paper identification information of the original and the paper identification information of the copy are associated with each other and stored; and
   in the information searching step, based on association of the paper identification information of the original and the paper identification information of the copy, information regarding the input or the output of the information of the original or the copy of the designated paper is further searched for.

7. The information tracking method according to claim 6, the method further comprising:
   an outputting step of outputting a searched result obtained in the information searching step to an outputting device.

8. The information tracking method according to claim 6, wherein:
   in the information search step, by comparing the paper identification information of the original or the paper identification information of the copy with the paper identification information stored in the recording device, information regarding the input or the output of the information of the original of the original or information regarding the input or the output of the information of the copy of the copy is further searched for.

9. The information tracking method according to claim 6, the method further comprising:
a removing step of removing the paper identification information of the original from the information of the original, wherein in the outputting step, the information is output after the paper identification information of the original is removed from the information.

10. The information tracking method according to claim 6, wherein:
the information regarding the input or the output of the information includes information identifying a user giving an instruction for the input or the output.

11. An image forming apparatus comprising:
a detecting unit for, whenever an input or an output of information is performed using a paper as a medium, detecting paper identification information, uniquely identifying the paper, from the paper; and
a storing unit for associating the paper identification information with information regarding the input or the output of the information and storing the paper identification information and the information regarding the input or the output of the information in a recording device, wherein:
in the storing unit, the paper identification information is associated with information regarding the input or the output of the information, and the paper identification information and the information regarding the input or the output of the information are stored in a computer connected to the apparatus through a network.

12. An image forming apparatus comprising:
a detecting unit for, whenever an input of information is performed using a paper as a medium, detecting paper identification information, synthesized within the information and uniquely identifying the paper, from the information;
an outputting unit for, whenever an output of information is performed using a paper as a medium, synthesizing and outputting the paper identification information for the paper to be output with the information; and
a storing unit for associating the paper identification information with information regarding the input or the output of the information and storing the paper identification information with the information regarding the input or the output of the information in a recording device, wherein:
the storing unit associates the paper identification information with information regarding the input or the output of the information, and the paper identification information and stores the paper identification information and the information regarding the input or the output of the information in a computer connected to the apparatus through a network.

13. An information processing apparatus comprising:
a second detecting unit performing the second detecting step of the information tracking method according to claim 1.

14. A non-transitory computer-readable medium having stored thereon a computer information tracking program that causes a computer to perform the information tracking method according to claim 1.

15. A non-transitory computer-readable medium having stored thereon a computer information tracking program that causes a computer to perform the information tracking method according to claim 6.

* * * * *